(12) United States Patent
Kanda et al.

(10) Patent No.: US 11,422,515 B2
(45) Date of Patent: Aug. 23, 2022

(54) OPTIMIZATION DEVICE AND METHOD FOR CONTROLLING OPTIMIZATION DEVICE

(71) Applicant: FUJITSU LIMITED, Kawasaki (JP)

(72) Inventors: Kouichi Kanda, Chofu (JP); Hirotaka Tamura, Yokohama (JP); Yasuhiro Watanabe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 286 days.

(21) Appl. No.: 16/838,057

(22) Filed: Apr. 2, 2020

(65) Prior Publication Data

US 2020/0326673 A1 Oct. 15, 2020

(30) Foreign Application Priority Data

Apr. 11, 2019 (JP) .............................. JP2019-075703

(51) Int. Cl.
| | |
|---|---|
| *G06F 17/16* | (2006.01) |
| *G06F 17/18* | (2006.01) |
| *G06F 17/11* | (2006.01) |
| *G05B 13/04* | (2006.01) |

(52) U.S. Cl.
CPC ............ *G05B 13/042* (2013.01); *G06F 17/11* (2013.01); *G06F 17/16* (2013.01); *G06F 17/18* (2013.01)

(58) Field of Classification Search
CPC .......... G06F 17/11; G06F 17/16; G06F 17/18; G06N 10/00–80
See application file for complete search history.

(56) References Cited

U.S. PATENT DOCUMENTS

| | | | |
|---|---|---|---|
| 2017/0161612 A1* | 6/2017 | Hastings | ................ G06F 30/00 |
| 2017/0351949 A1 | 12/2017 | Matsubara et al. | |
| 2018/0075342 A1 | 3/2018 | Tamura et al. | |
| 2019/0130295 A1* | 5/2019 | Okuyama | ............... G06F 17/11 |

FOREIGN PATENT DOCUMENTS

| | | |
|---|---|---|
| JP | 2018-41351 A | 3/2018 |
| WO | 2017/017807 A1 | 2/2017 |
| WO | 2017/056366 A1 | 4/2017 |

OTHER PUBLICATIONS

Stollenwerk, Tobias et al., "Quantum Annealing Applied to De-Conflicting Optimal Trajectories for Air Traffic Management", arxiv.org, Cornell University Library, 201 Olin Library Cornell University Thaca, NY 14853, pp. 1-13, Nov. 14, 2017.

(Continued)

*Primary Examiner* — Emily E Larocque
(74) *Attorney, Agent, or Firm* — Fujitsu Patent Center

(57) ABSTRACT

An information processing device includes: a memory; and a processor coupled to the memory and configured to calculate, for a plurality of bits corresponding to a plurality of spins included in an Ising model obtained by converting a problem to be calculated, in a case where the plurality of bits is divided into a plurality of groups, on the basis of a first local field value for a first bit having a value of 1 and a second local field value for a second bit having a value of 0 among a plurality of bits included in each of the plurality of groups, a first energy change of the Ising model due to a change of the value of the first bit from 1 to 0 and a change of the value of the second bit from 0 to 1.

5 Claims, 22 Drawing Sheets

(56) References Cited

OTHER PUBLICATIONS

Chancellor, Nicholas et al., "Domain wall encoding of integer variables for quantum annealing and QAOA", xrxiv.org, Cornell University Library, 201 Olin Library Cornell University Ithaca, NY 14853, pp. 1-13, Mar. 12, 2019.
Extended European Search Report dated Aug. 14, 2020 for corresponding European Patent Application No. 20164455.6, 6 pages.

* cited by examiner

FIG. 8

| gi=gx? | dx | $e_{kx}$ | $o_{kx}$ | SWITCHES 31a, 32b | SWITCHES 31b, 32a | HOLDING UNIT 30a OPERATION | HOLDING UNIT 30b OPERATION |
|---|---|---|---|---|---|---|---|
| YES | 1 | 0 | 1 | ON | OFF | WRITING | READING |
| YES | 1 | 1 | 0 | OFF | ON | READING | WRITING |
| NO | 0 | – | – | OFF | OFF | NO OPERATION | NO OPERATION | ns # OPTIMIZATION DEVICE AND METHOD FOR CONTROLLING OPTIMIZATION DEVICE

CROSS-REFERENCE TO RELATED APPLICATION

This application is based upon and claims the benefit of priority of the prior Japanese Patent Application No. 2019-75703, filed on Apr. 11, 2019, the entire contents of which are incorporated herein by reference.

FIELD

The present embodiment relates to an optimization device and a method for controlling the optimization device.

BACKGROUND

As a method of solving a multivariable optimization problem that a von Neumann computer is not good at, there is an optimization device (sometimes referred to as an Ising machine or a Boltzmann machine) using an Ising energy function. The optimization device performs calculation by replacing a problem to be calculated with an Ising model that is a model representing behavior of spins of magnetic material.

Japanese Laid-open Patent Publication No. 2018-041351, International Publication Pamphlet No. WO 2017/017807, and International Publication Pamphlet No. WO 2017/056366 are disclosed as related art.

SUMMARY

According to an aspect of the embodiments, an information processing device includes: a memory; and a processor coupled to the memory and configured to: calculate, for a plurality of bits corresponding to a plurality of spins included in an Ising model obtained by converting a problem to be calculated, in a case where the plurality of bits is divided into a plurality of groups, on the basis of a first local field value for a first bit having a value of 1 and a second local field value for a second bit having a value of 0 among a plurality of bits included in each of the plurality of groups, a first energy change of the Ising model due to a change of the value of the first bit from 1 to 0 and a change of the value of the second bit from 0 to 1; output first bit identification information for identifying one of a plurality of the second bits that allows update of the value from 0 to 1 among the second bits included in each of the plurality of groups, on the basis of a magnitude relationship between the first energy change and thermal excitation energy determined on the basis of an input temperature parameter and a random number; detect a first group to which the second bit allowed to be updated belongs on the basis of the first bit identification information, and output second bit identification information for identifying the first bit that belongs to the first group; update the value from 1 to 0 of the first bit that belongs to the first group on the basis of the second bit identification information, and update the value from 0 to 1 of the second bit allowed to be updated on the basis of the first bit identification information; hold, in a second storage area, all rows corresponding to bit identification information for identifying a bit having a value of 1 in a matrix of weight values that indicate a magnitude of interaction between each of the plurality of bits held in a first storage area, in each of the plurality of groups; and generate the first local field value and the second local field value, respectively on the basis of a first row corresponding to the first bit identification information read from the first storage area on the basis of the first bit identification information and a second row corresponding to the second bit identification information read from the second storage area.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram illustrating an operation example of a storage unit;

DESCRIPTION OF EMBODIMENTS

Figure 1:
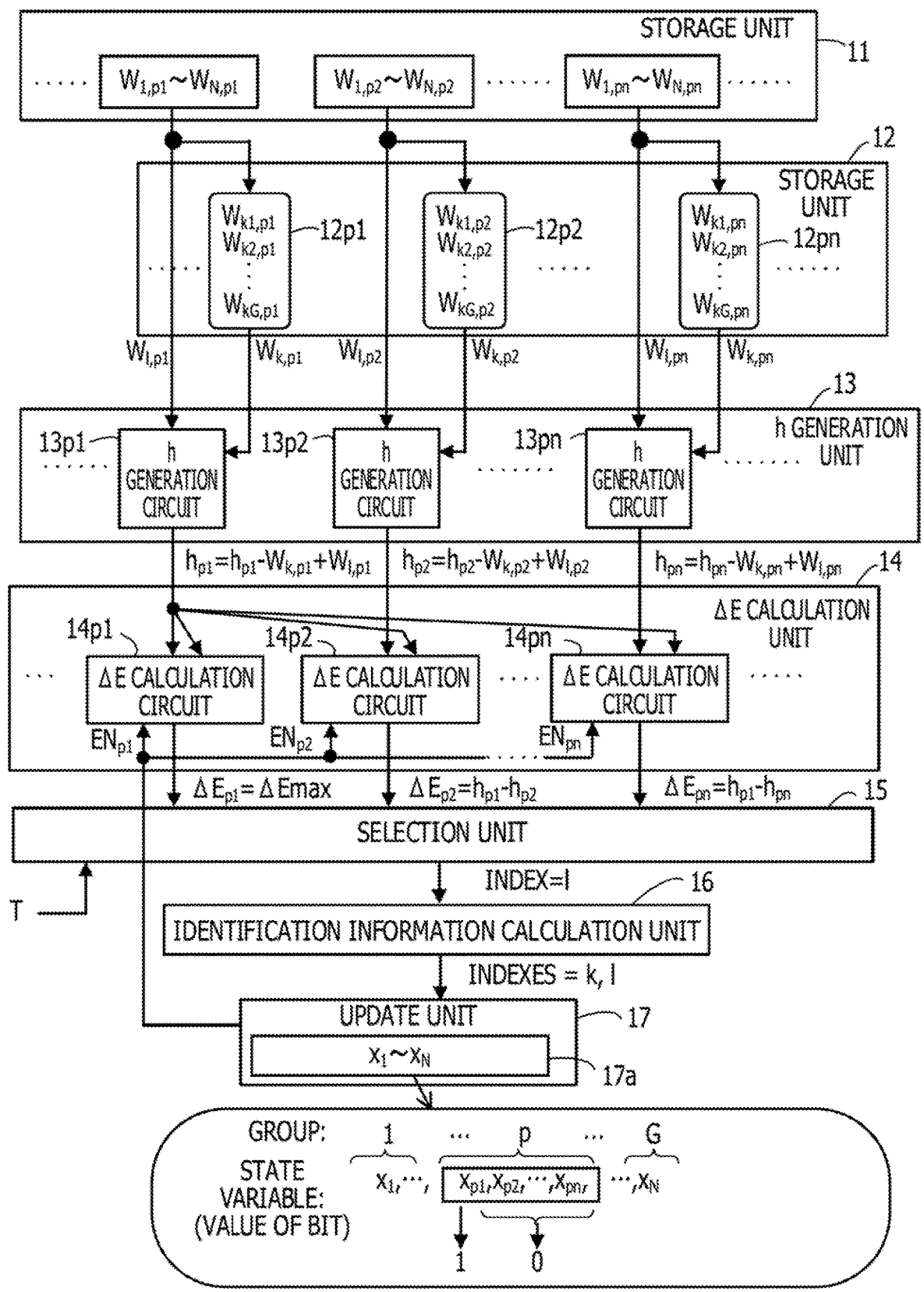
FIG. 1 is a diagram illustrating an example of an optimization device of a first embodiment.

The optimization device can also be modeled by using, for example, a neural network. In that case, each of a plurality of bits corresponding to a plurality of spins included in the Ising model functions as a neuron that outputs 0 or 1 depending on a weight value (also referred to as a coupling coefficient) indicating a magnitude of interaction between the bit itself and another bit, and a value of the other bit. The optimization device obtains as a solution a state (a combination of values of respective bits) in which the minimum value is obtained of a value (hereinafter referred to as energy) of the above-described energy function (also referred to as a cost function or an objective function), by a stochastic search method such as simulated annealing, for example.

There may be an optimization device that calculates a state in which energy is minimized by performing simulated annealing by using a digital circuit. The optimization device calculates an energy change assuming that only a value of one bit changes at a time, and determines whether or not to allow the bit change depending on a value obtained by adding a noise value corresponding to the temperature to the energy change. A change in the value of the bit that increases energy is also allowed with a predetermined probability, and the probability decreases as the temperature decreases.

By the way, there is an optimization problem having a constraint (one-hot constraint) in which the number of bits each having a value of 1 is only one in each of a plurality of groups each including a plurality of bits). For example, many scheduling problems (such as traveling salesman problems and vehicle routing problems), knapsack problems, bin packing problems, and the like each have the one-hot constraint.

As described above, in the optimization device, the number of bits that change at a time is one. For example, the optimization device searches for a ground state having the minimum energy while repeating a state transition with the Hamming distance=1. In the optimization device, transition therefore occurs to a state not satisfying the one-hot constraint, and the number of states in which transition can occur (search space) is greater than the number of states satisfying the one-hot constraint. Furthermore, the state transition takes time due to an energy barrier generated by a one-hot constraint term. From the above, the optimization device has a problem that it takes time to calculate an optimization problem having the one-hot constraint (to search for the ground state).

In one aspect, an optimization device and a method for controlling the optimization device capable of shortening the calculation time of an optimization problem having the one-hot constraint may be provided.

Hereinafter, embodiments will be described with reference to the drawings.

An optimization device described below shortens the calculation time of an optimization problem having the one-hot constraint by excluding a search for a state other than a state satisfying the one-hot constraint.

In a case where values of N bits corresponding to a plurality of spins (the number of spins=N) included in an Ising model are represented by state variables $x_1$ to $x_N$, the one-hot constraint is satisfied, for example, when there is only one state variable having a value of 1 in a group in each { } of an expression (1) below.

[Math. 1]

$$x=(\{x_1, \ldots, x_{s_1}\}, \{x_{s_1+1}, \ldots, x_{s_2}\}, \ldots, \{x_{s_{G-1}+1}, \ldots, x_N\}) \quad (1)$$

For example, in a case where there are three state variables $x_1, x_2, x_3$ in a group, states $\{x_1, x_2, x_3\}=\{1, 0, 0\}, \{0, 1, 0\}, \{0, 0, 1\}$ satisfy the one-hot constraint. On the other hand, states $\{x_1, x_2, x_3\}=\{0, 0, 0\}, \{1, 1, 0\}, \{1, 0, 1\}, \{0, 1, 1\}, \{1, 1, 1\}$ do not satisfy the one-hot constraint. To make a transition from one state satisfying the one-hot constraint to another state satisfying the one-hot constraint, the optimization device changes the values of two bits in one time of state update processing. For example, the optimization device generates a state transition of Hamming distance=2.

The one-hot constraint can be expressed by an expression (2) below.

[Math. 2]

$$\sum_{i=s_{n-1}+1}^{s_n} x_i = 1 \text{ where} \quad (2)$$

$$s_n = \sum_{j=1}^{n} m_j (n = 1, 2, \ldots, G, s_0 = 0, s_G = N)$$

In the expression (2), G is the number of groups (an integer greater than or equal to 2), and $m_j$ is the number of state variables belonging to a group j.

An energy function of the optimization problem in consideration of the one-hot constraint can be expressed as an expression (3) below.

[Math. 3]

$$E(x)=\Sigma \text{Cost}(x_i)+\lambda_1(\Sigma x_i-1)^2+\lambda_2 f_2(x_i)+\ldots+\lambda_N f_i(x_i) \quad (3)$$

In the expression (3), the first term on the right side is a cost function, the second term is a one-hot constraint term in consideration of the one-hot constraint, and the third term and subsequent terms are constraint terms in consideration of other constraints (other one-hot constraint terms may be included in the constraint terms). In a case where the one-hot constraint is not satisfied, a sufficiently large value is used as $\lambda_1$ (constraint weight) so that the energy does not decrease.

On the other hand, an Ising energy function E(x) using weight values is defined by an expression (4) below, for example.

[Math. 4]

$$E(x) = -\sum_{\langle i,j \rangle} W_{ij} x_i x_j - \sum_i b_i x_i \quad (4)$$

The first term on the right side is the integration of the products of values (0 or 1) of two bits and weight values, for all combinations of two bits that can be selected from all bits included in the Ising model, without omission and duplication. The state variable $x_i$ represents a value of a bit with an index (bit identification information)=i, the state variable $x_j$ represents a value of a bit with an index=j, and $W_{ij}$ is a weight value indicating a magnitude of interaction between the bits with indexes=i, j. Note that, $W_{ii}$=0. Furthermore, in many cases, $W_{ij}$=$W_{ji}$ (for example, a coefficient matrix based on weight values is often a symmetric matrix).

The second term on the right side is the sum of the products of bias values and values of bits for all bits. The bias value of the bit with the index=i is represented by $b_i$.

In a case where the search is performed for the state other than the state satisfying the one-hot constraint, the number of bits for expressing $W_{ij}$ in the expression (4) increases as the value of $\lambda_1$ in the expression (3) increases. The value of $\lambda_1$ is determined, for example, in consideration of the balance with the above-described N (corresponding to the size in the problem) and $W_{ij}$. For example, first, $W_{ij}$ and $b_i$ are calculated by using $\lambda_1$ that is about 10 times the maximum value of $W_{ij}$, and energy minimization is performed. If a convergent solution does not satisfy the one-hot constraint, the value of $\lambda_1$ is increased until the solution satisfies the one-hot constraint.

On the other hand, in a case where the search is performed for only the state satisfying the one-hot constraint, since the one-hot constraint term of the second term on the right side of the expression (3) can be reduced, the number of bits for expressing $W_{ij}$ can be reduced.

By the way, in the expression (4), when the value of $x_i$ changes and becomes $1-x_i$, an increment of $x_i$ can be expressed as $\Delta x_i=(1-x_i)-x_i=1-2x_i$. An energy change ($\Delta E_i$) accompanying this change in the value is expressed by an expression (5) below.

[Math. 5]

$$\Delta E_i = E(x)|_{x_i \to 1-x_i} - E(x) = -\Delta x_i \left( \sum_j W_{ij} x_j + b_i \right) = -\Delta x_i h_i \quad (5)$$

In the expression (5), when $x_i$ changes from 1 to 0, $\Delta x_i$ becomes $-1$, and when $x_i$ changes from 0 to 1, $\Delta x_i$ becomes 1. Note that, $h_i$ is referred to as a local field value (local field), and $\Delta E_i$ is obtained by multiplying $h_i$ by a sign (+1 or $-1$) depending on $\Delta x_i$.

A change in $h_i$ of when $x_j$ changes from 0 to 1 is $\Delta h_i^{(j)}=+W_{ij}$, and the change in $h_i$ of when $x_j$ changes from 1 to 0 is $\Delta h_i^{(j)}=-W_{ij}$. Similarly, a change in $h_j$ for the bit with the index=j of when $x_i$ changes can be expressed as $\Delta h_j^{(i)}=\Delta x_i W_{ij}$.

Thus, the energy change of when both $x_i$ and $x_j$ change can be expressed by an expression (6) below.

[Math. 6]

$$\Delta E_{ij}=-\Delta x_i h_i-\Delta x_j(h_j+\Delta x_i W_{ij})=-\Delta x_i h_i-\Delta x_j h_j-\Delta x_i \Delta x_j \Delta W_{ij} \quad (6)$$

As described above, to make a transition from one state satisfying the one-hot constraint to another state satisfying the one-hot constraint, the values of two bits are changed. When an energy change is denoted as $\Delta E_j$ in a case where the value of the bit with the index=i changes from 1 to 0 and the value of the bit with the index=j changes from 0 to 1, since $\Delta x_i=-1$ and $\Delta x_j=1$, from the expression (6), $\Delta E_j$ can be expressed by an expression (7) below.

[Math. 7]

$$\Delta E_j = h_i - h_j + W_{ij} \quad (7)$$

The optimization device described below includes a circuit that calculates the energy change expressed by the expression (7).

By the way, when the optimization device searches for a ground state by repeating processing of changing values of two bits in one time of the state update processing, the local field value is updated to calculate the energy change, in each time of the state update processing. For example, in a case where the value of a bit with an index=l changes from 0 to 1 and the value of a bit with an index=k changes from 1 to 0 in a group, $h_1$ to $h_N$ for the N bits are updated on the basis of an expression (8) below.

[Math. 8]

$$\begin{array}{rcccc}
(h_1, & h_2, & \ldots, & h_N) & \\
-(W_{k,1}, & W_{k,2}, & \ldots, & W_{k,N}) & \\
+(W_{l,1}, & W_{l,2}, & \ldots, & W_{l,N}) & \\
\hline
(h_1^{(kl)}, & h_2^{(kl)}, & \ldots, & h_N^{(kl)},) &
\end{array} \quad (8)$$

In the expression (8), $h_1^{(kl)}$ to $h_N^{(kl)}$ are local field values after the update.

To calculate $h_1^{(kl)}$ to $h_N^{(kl)}$, as indicated in the expression (8), in the matrix of weight values, a row ($W_{k,1}$ to $W_{k,N}$) for the index=k and a row ($W_{l,1}$ to $W_{l,N}$) for the index=l are used.

In the optimization device in which the repetition processing is performed a large number of times, in each time of the state update processing, in a case where the weight values of each row is read from a memory storing the weight values by two memory accesses, the throughput performance decreases.

The optimization device described below not only excludes the search for the state other than the state satisfying the one-hot constraint, but also suppresses the above-described decrease in the throughput performance.

First Embodiment

FIG. 1 is a diagram illustrating an example of an optimization device of a first embodiment.

An optimization device 10 includes storage units 11 and 12, an h generation unit 13, a $\Delta E$ calculation unit 14, a selection circuit 15, an identification information calculation unit 16, and an update unit 17.

Note that, FIG. 1 illustrates a circuit portion that calculates an energy change due to occurrence of the state transition of the Hamming distance=2 between a plurality of (n) bits included in a p-th group p in a case where the N bits are divided into G groups. In FIG. 1, illustration is omitted of circuit portions that calculate energy changes for other groups.

The storage unit 11 holds a matrix of weight values indicating magnitudes of interaction between each of the N bits. The matrix of the weight values is stored in the storage unit 11 by a control unit (not illustrated) during initial setting processing. In the example of FIG. 1, weight values are illustrated indicating magnitudes of interaction between each of the bits (indexes=p1 to pn) included in the group p and the N bits. The storage unit 11 is implemented by using, for example, a register, a Static Random Access Memory (SRAM), or the like.

The storage unit 12 holds all rows corresponding to an index for identifying a bit having a value of 1 in the matrix of the weight values held by the storage unit 11, in each of the G groups. In the example of FIG. 1, in each of groups 1 to G, indexes of the bits each having a value of 1 are denoted as k1 to kG. For example, an index=k1 is an index of a bit having a value of 1 in the group 1, and an index=kG is an index of a bit having a value of 1 in the group G.

Furthermore, the example of FIG. 1 illustrates holding units 12p1, 12p2, . . . , and 12pn that hold weight values between each of n bits included in the group p and the bits each having a value of 1 in respective groups. For example, the holding unit $12p1$ holds weight values ($W_{k1,p1}$, $W_{k2,p2}$, ..., $W_{kG,p1}$) indicating magnitudes of interaction between the bit with the index=p1 and bits with respective indexes=k1 to kG. The holding unit $12pn$ holds weight values ($W_{k1,pn}$, $W_{k2,pn}$, ..., $W_{kG,pn}$) indicating magnitudes of interaction between the bit with the index=pn and the bits with the respective indexes=k1 to kG. The holding units $12p1$ to $12pn$ each are implemented by using, for example, a register, an SRAM, or the like.

As will be described later, the selection circuit 15 outputs the index=l of a bit whose value is allowed to be changed from 0 to 1. At that time, weight values between all the bits and the bit having a value of 1 (the bit with the index=k (any one of k1 to kG)) among the bits included in a group to which the bit with the index=l belongs are read from the storage unit 12. For example, a row of the weight values corresponding to the index=k is read from the storage unit 12. For example, in a case where the index=l is an index of any bit belonging to the group 2, a row of weight values of $W_{k2,1}$ to $W_{k2,N}$ is read from the storage unit 12.

The weight values held in the storage unit 12 are updated by a row of the weight values corresponding to the index=l read from the storage unit 11. This is because in a case where the value of another bit of the group to which the bit with the index=l belongs changes from 0 to 1 next, the row of the weight values corresponding to the index=l can be used as the row of the weight values corresponding to the index=k.

Note that, since writing to the storage unit 12 and reading from the storage unit 12 are performed on weight values regarding bits belonging to the same group, a configuration is applied for reducing occurrence of a so-called read-write problem. An example of the configuration will be described later.

Furthermore, in a case where a replica exchange method (also referred to as an exchange Monte Carlo method) described later is performed in the optimization device 10, the weight values held in the storage unit 12 are held independently for each of a plurality of replicas.

The h generation unit 13 generates local field values on the basis of the row of the weight values corresponding to the index=l read from the storage unit 11 and the row of the weight values corresponding to the index=k read from the storage unit 12. Readings from the storage units 11 and 12 are performed at the same timing (clock timing).

In the example of FIG. 1, the h generation unit 13 includes h generation circuits $13p1$, $13p2$, ..., and $13pn$ that generate $h_{p1}$, $h_{p2}$, ..., and $h_{pn}$ that are local field values for the respective n bits included in the group p. Although not illustrated, each of the h generation circuits $13p1$ to $13pn$ includes a holding unit (for example, a register), and holds and updates any one of $h_{p1}$ to $h_{pn}$. For example, the h generation circuit $13p1$ updates $h_{p1}$ by calculating $h_{p1} - W_{k,p1} + W_{l,p1}$ by using $W_{k,p1}$ and $W_{l,p1}$. In a case where the bit with the index=l belongs to group 1, $W_{k,p1} = W_{k1,p1}$. The h generation circuit $13pn$ updates $h_{pn}$ by calculating $h_{pn} - W_{k,pn} + W_{l,pn}$ by using $W_{k,pn}$, $W_{l,pn}$. In a case where the bit with the index=l belongs to group 1, $W_{k,pn} = W_{k1,pn}$.

Initial values of $h_{p1}$ to $h_{pn}$ are, for example, bias values ($b_{p1}$ to $b_{pn}$), and are set by the control unit (not illustrated) during the initial setting processing. The h generation circuits $13p1$ to $13pn$ are implemented by using, for example, an adder or a subtractor in addition to the register. In the case where the replica exchange method described later is performed in the optimization device 10, $h_{p1}$ to $h_{pn}$ are held independently for each replica.

The ΔE calculation unit 14 calculates an energy change on the basis of the local field values generated by the h generation unit 13. In the example of FIG. 1, the ΔE calculation unit 14 includes ΔE calculation circuits $14p1$, $14p2$, ..., and $14pn$ that calculate energy changes ($ΔE_{p1}$, $ΔE_{p2}$, $ΔE_{pn}$) in a case where the respective n bits included in the group p change.

When the group p satisfies the one-hot constraint, among the n bits included in the group p, a value of one bit is 1 and values of other bits are 0. Hereinafter, among state variables ($x_{p1}$, ..., $x_{pn}$) indicating the values of the n bits in the group p, it is assumed that $x_{p1}$ is 1, and $x_{p2}$ to $x_{pn}$ are 0.

In that case, the ΔE calculation circuits $14p2$ to $14pn$ calculate $ΔE_{p1}$ to $ΔE_{pn}$ due to a change in which $x_{p1}$ changes from 1 to 0 and values of $x_{p2}$ to $x_{pn}$ change from 0 to 1, on the basis of $h_{p2}$ to $h_{pn}$. Among $ΔE_{p1}$ to $ΔE_{pn}$, $ΔE_{p2}$ to $ΔE_{pn}$ are calculated on the basis of the expression (7). Note that, in $W_{ij}x_ix_j$, of the expression (4), in a case where $x_i$ and $x_j$ are values of two bits belonging to the same group in which the same one-hot constraint is desirably satisfied, since $x_i$ or $x_j$ is 0 (in the example of FIG. 1, $x_{p1}=1$, $x_{p2}$ to $x_{pn}=0$), $W_{ij}x_ix_j=0$ is obtained. For example, $W_{ij}$ does not contribute to energy. For this reason, $W_{ij}=0$ is set in the example of FIG. 1. Thus, for example, $ΔE_{p2}$ is calculated by an expression $ΔE_{p2}=h_{p1}-h_{p2}$, and $ΔE_{pn}$ is calculated by an expression $ΔE_{pn}=h_{p1}-h_{pn}$.

Note that, in the state transition of the Hamming distance=2, there is also a transition in which $x_i$ changes from 1 to 0 and further changes from 0 to 1. However, since there is no change in the state, it is not desirable that such a state transition occurs in reduction of the calculation time. In the example of FIG. 1, one local field value ($h_{p1}$) is supplied to the ΔE calculation circuit $14p1$ that calculates $ΔE_{p1}$ of when $x_{p1}$ having a value of 1 changes. In a case where such a ΔE calculation circuit $14p1$ calculates $ΔE_{p1}$ of when $x_{p1}$ changes twice as described above on the basis of $h_{p1}$, the expression (7) of when i=j is calculated, and $ΔE_{p1}=0$ is obtained. In the case of $ΔE_{p1}=0$, there is a possibility that the above-described state transition in which $x_{p1}$ changes twice is allowed due to processing by the selection circuit 15 described later. In the selection circuit 15, as the energy change becomes a larger positive value, an allowable probability of the state transition causing the energy change decreases. Therefore, the ΔE calculation circuit $14p1$ is controlled by the update unit 17 to output a predetermined positive value (denoted as "ΔEmax" in FIG. 1). ΔEmax is, for example, a positive maximum value that can be generated by the optimization device 10. For example, in a case where the optimization device 10 can generate a 26-bit value, the positive maximum value is 01 . . . 1 (the number of 1s is 25) when expressed by a two's complement.

For example, a control signal $EN_{p1}$ having a value of 1 is supplied from the update unit 17 to the ΔE calculation circuit $14p1$, and the ΔE calculation circuit $14p1$ outputs the above described ΔEmax. On the other hand, the ΔE calculation circuits $14p2$ to $14pn$ are supplied with, for example, control signals $EN_{p2}$ to $EN_{pn}$ each having a value of 0 from the update unit 17, and the ΔE calculation circuits $14p2$ to $14pn$ calculate the above-described energy change.

Note that, in the example of FIG. 1, it is assumed that there are three or more bits in the group p, but the number of bits may be two.

The selection circuit 15 outputs the index=l for identifying one bit that allows update of the value from 0 to 1 from among bits each having a value of 0 included in each of the groups 1 to G, on the basis of magnitude relationships between thermal excitation energy and energy changes output by the respective plurality of ΔE calculation circuits. The thermal excitation energy is determined on the basis of a random number and a temperature parameter (T) input from the control unit (not illustrated).

In a case where simulated annealing is performed in the optimization device 10, T is controlled by, for example, the control unit so that the value is decreased each time the processing of updating the state of the Ising model is repeated a predetermined number of times. Furthermore, in the case where the replica exchange method described later is performed, different values of T are applied to the respective plurality of replicas. Note that, a circuit example will be described later that executes a function of the selection circuit 15 as described above.

The identification information calculation unit 16 detects a group to which the bit allowed to be updated belongs on the basis of the index output by the selection circuit 15, and outputs the index=k for identifying a bit having a value of 1 belonging to the detected group. The identification information calculation unit 16 detects a group and generates an index by using table data or a logic circuit, for example.

In the example of FIG. 1, the identification information calculation unit 16 also outputs the index=l, but in a case where the index=l output by the selection circuit 15 is directly supplied to the update unit 17, the identification information calculation unit 16 does not have to output the index=l.

The update unit 17 includes a storage unit 17a that holds values ($x_1$ to $x_N$) of the N bits. The storage unit 17a is implemented by using, for example, a register, an SRAM, or the like. The update unit 17 updates the value of the bit identified by the index=k output by the identification information calculation unit 16 from 1 to 0, and updates the value of the bit identified by the index=l from 0 to 1. Furthermore, the update unit 17 outputs the above-described control signals $EN_{p1}$ to $EN_{pn}$ on the basis of $x_1$ to $x_N$.

Note that, although not illustrated in FIG. 1, the index=l is used to select weight values to be supplied to the storage unit 12 or the h generation unit 13 from among the weight values stored in the storage unit 11. Furthermore, the identification information calculation unit 16 may output group identification information (group index) for identifying the detected group. The group index is used when the weight values stored in the storage unit 12 is updated, for example. These types of processing will be described later.

Hereinafter, an operation example will be described of the optimization device 10. The optimization device 10 uses the above-described simulated annealing or replica exchange method.

The replica exchange method is a method in which state transitions are performed independently (logically) in parallel to a plurality of temperatures, energies of respective states (replicas) are compared with each other at every certain number of iterations, and the states are exchanged between different temperatures with a predetermined probability (for example, probability according to a Metropolis method). Therefore, an effect can be obtained similar to that of the simulated annealing, and it is possible to shorten relaxation time for a probability distribution of states at respective temperatures to converge to a Boltzmann distribution, as compared with the simulated annealing. Note that, a similar effect can be obtained by exchanging the temperatures between the replicas instead of the states. In a case where the replica exchange method is implemented with the optimization device 10 as illustrated in FIG. 1, the plurality of replicas is pipelined and operated. Then, the control unit (not illustrated) exchanges the temperatures between the replicas for which adjacent temperatures are set, with the predetermined probability, on the basis of the energy of each replica, at every certain number of iterations. The amount of data to be transmitted and received can be reduced more in replacing the temperature than in replacing the state.

Hereinafter, a flow will be described of an example of operation of the optimization device 10.

First, initial setting is performed. The initial setting includes, for example, processing of setting all of $x_1$ to $x_N$ to 0 under the control of the control unit (not illustrated), and then setting the value of one bit to 1 and the value of the other bits to 0 in each group, and setting of initial values of the local field values. Moreover, as the initial setting, processing of writing the weight values into the storage unit 12, processing of generating (updating) the local field values based on the values of the respective set bits and the expression (5), and the like are performed.

After the initialization as described above, the ΔE calculation circuits 14p1 to 14pn calculate $\Delta E_{p1}$ to $\Delta E_{pn}$ as described above, and the selection circuit 15 outputs the index=l for identifying one bit that allows update of the value from 0 to 1.

For example, in a case where the index=l output by the selection circuit 15 matches the index=pn of a bit having a value of 0, the identification information calculation unit 16 detects the group p on the basis of the index=l. Then, the identification information calculation unit 16 outputs the index=p1 of the bit having a value of 1 in the group p as the index=k.

In that case, the update unit 17 receives the indexes=k, l, and updates $x_{p1}$ from 1 to 0 and updates $x_{pn}$ from 0 to 1. As a result, in the group p, transition becomes possible between the states satisfying the one-hot constraint.

Furthermore, in a case where $x_{p1}$ is updated from 1 to 0 and $x_{pn}$ is updated from 0 to 1, in the ΔE calculation unit 14, $h_{pn}$ is supplied to the ΔE calculation circuit 14p1, and the ΔE calculation circuit 14p1 calculates $\Delta E_{p1}=h_{pn}-h_{p1}$. On the other hand, the ΔE calculation circuit 14pn calculates ΔEmax. As described above, among the ΔE calculation circuits 14p1 to 14pn, the ΔE calculation circuit to which two different local field values are supplied changes every time the values of the bits belonging to the group p are updated. An example will be described later of such a configuration for controlling a change of a supply destination of the local field values.

Furthermore, when the selection circuit 15 outputs the index=l, the h generation unit 13 updates the local field values. During update of the local field values, the weight values for generating the local field values are supplied from the storage units 11 and 12 to the h generation unit 13 at the same timing. For example, in the h generation unit 13, to the h generation circuits 13p1 to 13pn that generate the local field values for bits belonging to the group p, $W_{l,p1}$ to $W_{l,pn}$ are supplied from the storage unit 11, and $W_{k,p1}$ to $W_{k,pn}$ are supplied from the storage unit 12. Then, the h generation circuits 13p1 to 13pn update $h_{p1}$ to $h_{pn}$ as described above. Furthermore, at this time, $W_{l,1}$ to $W_{l,N}$ are written to the storage unit 12. For example, in the case of the index=l=pn, $W_{pn,1}$ to $W_{pn,N}$ are read from the storage unit 11, and written to the storage unit 12.

In the case where the simulated annealing is performed, for example, the states ($x_1$ to $x_N$) obtained after the above-described state update processing is repeated a predetermined number of times are output as solutions to the optimization problem.

Note that, the update unit 17 may update the energy on the basis of $\Delta E_j$ corresponding to the indexes=k, l, and hold the minimum energy at each update time and a state of when the minimum energy is obtained (state at the time of the minimum energy). In that case, the update unit 17 may output as a solution the state at the time of the minimum energy held when the state update processing is repeated the predetermined number of times.

Furthermore, in the case where the replica exchange method is performed instead of the simulated annealing, the above-described state update processing is performed for each replica. Then, the temperatures are exchanged between the replicas for which the adjacent temperatures are set, with the predetermined probability, on the basis of the energy of each replica, at every certain number of times of repetition. Then, when the predetermined number of times of repetition is reached, the update unit 17 outputs as a solution the state at the time of the minimum energy among the energies obtained so far in all the replicas.

As described above, according to the optimization device 10 of the first embodiment, it is determined which two bit transitions are allowed on the basis of the energy change of when one bit having a value of 1 and one bit having a value of 0 in each group both change. Then, the values of the determined two bits are updated. As a result, state transitions not satisfying the one-hot constraint are suppressed, and the search space can be reduced. For this reason, the search for the ground state can be sped up.

Furthermore, according to the optimization device 10, since the one-hot constraint term of the second term on the right side of the expression (3) can be reduced, an energy barrier caused by the one-hot constraint term can be reduced, and the time of the state transition can be shortened.

Furthermore, since the one-hot constraint term of the second term on the right side of the expression (3) can be reduced as described above, the number of bits for expressing the weight values can be reduced, and the amount of hardware for storing the weight values can be reduced.

Moreover, the optimization device 10 of the first embodiment is provided with the storage unit 12, so that the following effects are obtained. Hereinafter, an optimization device not provided with the storage unit 12 will be described as a comparative example.

Figure 2:
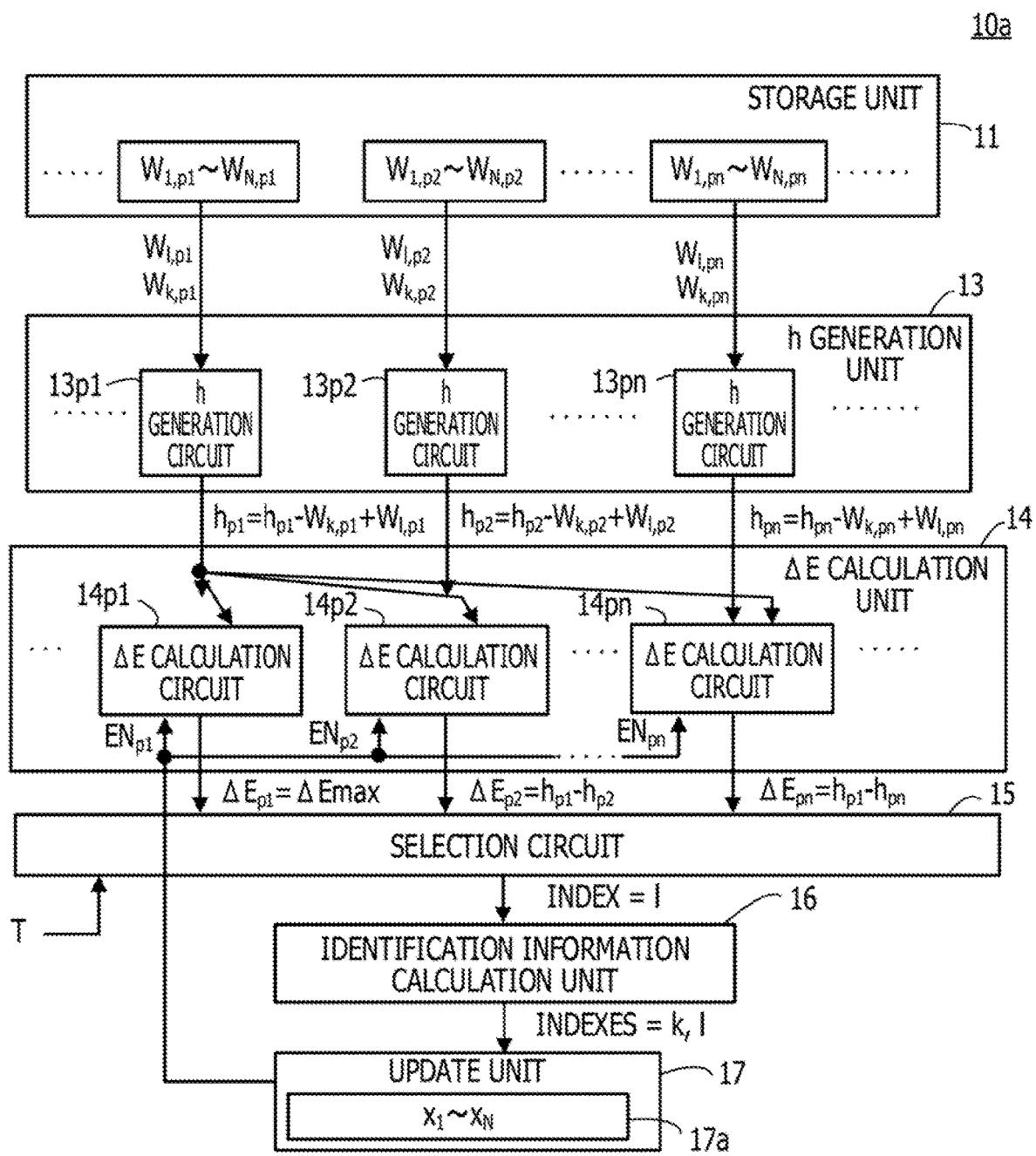
FIG. 2 is a diagram illustrating an optimization device of a comparative example.

FIG. 2 is a diagram illustrating an optimization device of a comparative example. In FIG. 2, the same elements as those illustrated in FIG. 1 are denoted by the same reference numerals.

In an optimization device 10a illustrated in FIG. 2, the weight values regarding the index=l and the weight values regarding the index=k for updating the local field values are read from the storage unit 11 at different timings, and supplied to the h generation unit 13. For example, in each update of the local field values, memory access occurs twice consecutively.

Figure 3:
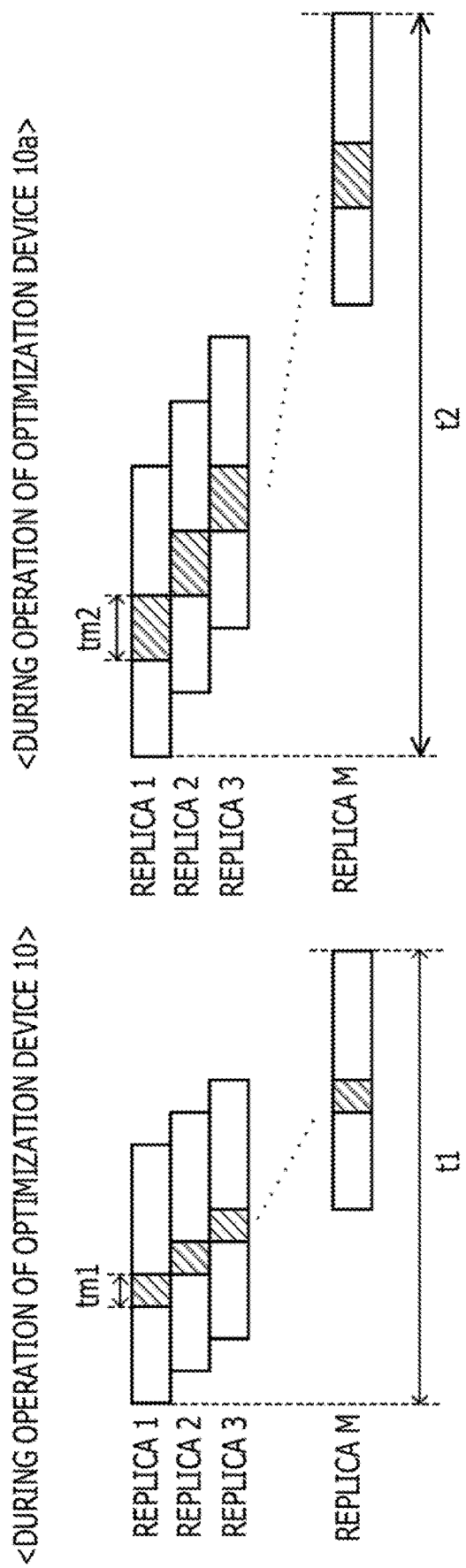
FIG. 3 is a schematic diagram illustrating a difference in processing time between the optimization device of the first embodiment and the optimization device of the comparative example when a replica exchange method is used.

FIG. 3 is a schematic diagram illustrating a difference in processing time between the optimization device of the first embodiment and the optimization device of the comparative example when the replica exchange method is used.

FIG. 3 illustrates an example of the processing time in a case where M replicas are pipelined and state update processing is performed once on each replica.

Times tm1 and tm2 represent times at which the optimization devices 10 and 10a read the weight values for updating the local field values. The optimization device 10 reads the weight values regarding the index=l and the weight values regarding the index=k from the storage units 11 and 12 at the same timing. For this reason, the time tm1 is shorter than the time tm2. Since the memory access for reading the weight values is performed for each replica, when the number of replicas increases, a difference between the times tm1 and tm2 is more remarkably reflected in the processing time, and leads to a difference between processing times t1 and t2 as illustrated in FIG. 3, for example.

Note that, also in a case where the simulated annealing is used, the memory access time can be shortened in each update of the local field values, so that an increase in processing time can be suppressed.

As described above, in the optimization device 10 of the first embodiment, the weight values regarding the index=k are held in the storage unit 12 different from the storage unit 11 in advance, whereby the memory access time can be shortened and a decrease in throughput can be suppressed. For this reason, the calculation time of the optimization problem having the one-hot constraint can be further shortened.

Second Embodiment

Figure 4:
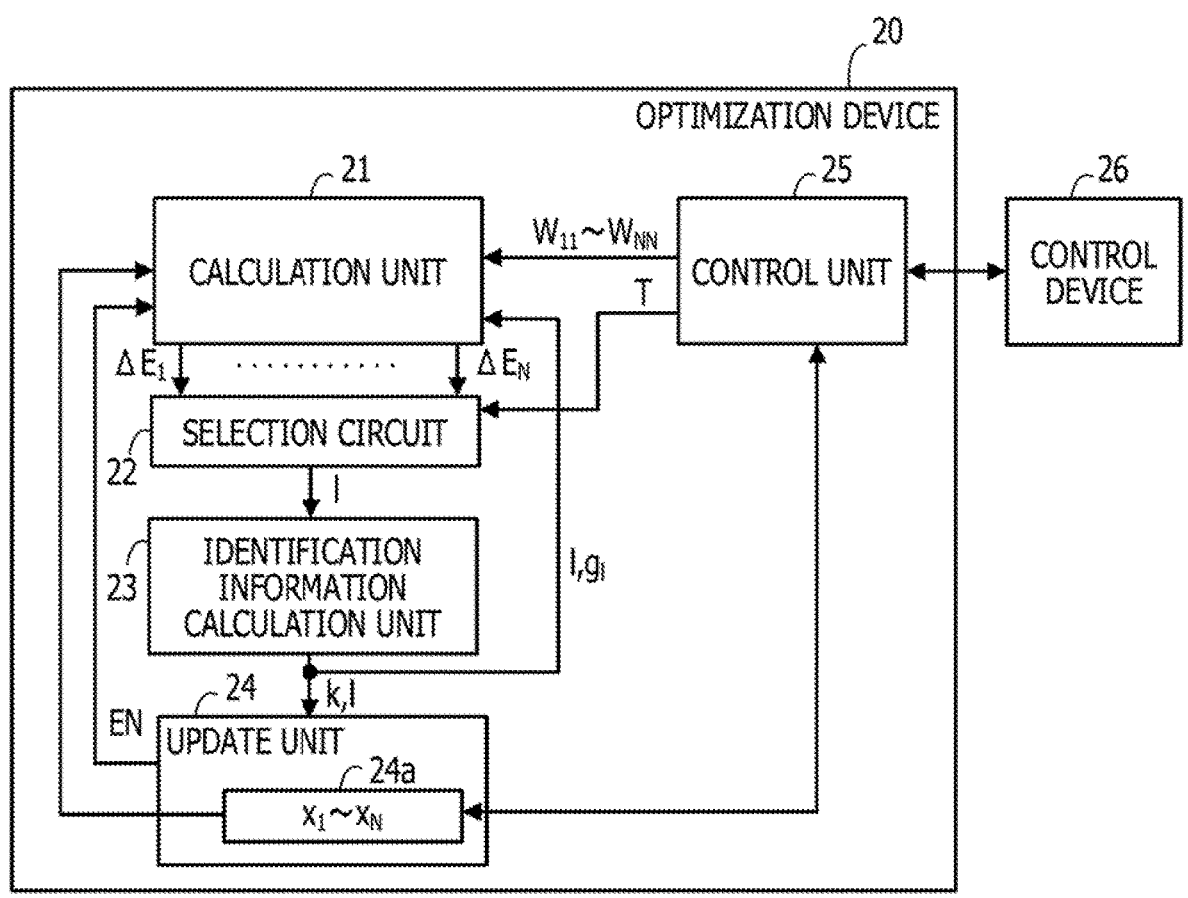
FIG. 4 is a diagram illustrating an example of an optimization device of a second embodiment.

FIG. 4 is a diagram illustrating an example of an optimization device of a second embodiment.

An optimization device 20 includes a calculation unit 21, a selection circuit 22, an identification information calculation unit 23, an update unit 24, and a control unit 25.

The calculation unit 21 calculates energy changes ($\Delta E_1$ to $\Delta E_N$) of when transition is performed from one state satisfying the one-hot constraint to another state satisfying the one-hot constraint by the state transition of the Hamming distance=2, in each of the G groups described above.

The selection circuit 22 outputs an index=l for identifying one bit that allows update of a value from 0 to 1 from among bits each having a value of 0 included in each of the groups 1 to G, on the basis of the magnitude relationships between thermal excitation energy and $\Delta E_1$ to $\Delta E_N$. The thermal excitation energy is determined on the basis of a random number and T input from the control unit 25. Note that, depending on the magnitude relationships between the thermal excitation energy and $\Delta E_1$ to $\Delta E_N$, there is a case where even one of the bits each having a value of 0 is not allowed to be updated. In the following, it is assumed that the selection circuit 22 outputs a flag indicating whether or not update is allowed, together with the index=l.

The identification information calculation unit 23 detects a group to which the bit allowed to be updated belongs, on the basis of the index=l and the flag output by the selection circuit 22. Then, the identification information calculation unit 23 outputs an index=k for identifying a bit having a value of 1 belonging to the detected group, and a group index=$g_l$ for identifying the detected group. In the following, it is assumed that the identification information calculation unit 23 also outputs the index=l and the flag supplied from the selection circuit 22. The index=l is supplied to the calculation unit 21, and is used when a local field value for each bit used for calculating an energy change is updated. Furthermore, the group index=$g_l$ is also supplied to the calculation unit 21, and is used when weight values are updated held in a storage unit included in the calculation unit 21 and the like.

Note that, in a case where the flag has a value indicating that update is not allowed, the identification information calculation unit 23 sets, for example, the indexes=k, l, and the group index=$g_l$ to invalid values (for example, 0).

The update unit 24 includes a storage unit 24a that holds values ($x_1$ to $x_N$) of N bits. In a case where the replica exchange method is applied, the values of the N bits are held for each replica. The storage unit 24a is implemented by using, for example, a register, an SRAM, or the like. In a case where the flag has a value indicating that update is allowed, the update unit 24 updates the value of the bit identified by the index=k output by the identification information calculation unit 23 from 1 to 0, and updates the value of the bit identified by the index=l from 0 to 1. Note that, the update unit 24 may update the energy on the basis of the energy change corresponding to the indexes=k, l, and hold the minimum energy at each update time and a state of when the minimum energy is obtained (state at the time of the minimum energy). Furthermore, the update unit 24 supplies a control signal EN to the calculation unit 21, and supplies $x_1$ to $x_N$ to the calculation unit 21. An example will be described later of processing of the calculation unit 21 using the control signal EN and $x_1$ to $x_N$.

The control unit 25 performs initial setting processing described later of the optimization device 20. Furthermore, in the case where the simulated annealing is performed, the control unit 25 decreases the value of T in accordance with a temperature schedule specified by the control device 26, for example, each time the processing of updating the state of the Ising model is repeated a predetermined number of times. Furthermore, in the case where the replica exchange method is performed, the control unit 25 exchanges the temperatures between the replicas for which adjacent temperatures are set, at a predetermined exchange probability, on the basis of the energy of each replica, each time the processing of updating the state of the Ising model is repeated the predetermined number of times.

Moreover, in the case where the simulated annealing is performed, the control unit 25 obtains the states ($x_1$ to $x_N$) held in the storage unit 24a after the state update processing is repeated the predetermined number of times, and transmits the states to the control device 26 as solutions to the optimization problem, for example. Note that, in a case where the storage unit 24a of the update unit 24 holds the minimum energy or the state at the time of the minimum energy, the control unit 25 may acquire and transmit information on the energy and state to the control device 26 after the state update processing is repeated the predetermined number of times. In the case where the replica exchange method is performed, the control unit 25 causes the storage unit 24a of the update unit 24 to hold the minimum energy and the state at the time of the minimum energy in each replica. Then, when the predetermined number of times of repetition is reached, the control unit 25 may acquire, from the update unit 24, the minimum energy and the state at the time of the minimum energy from among the energies obtained so far, in all the replicas, and transmits the energy and state to the control device 26 as a solution to the optimization problem, for example.

The control unit 25 can be implemented by an electronic circuit for a specific application, for example, an Application Specific Integrated Circuit (ASIC), a Field Programmable Gate Array (FPGA), and the like. Note that, the control unit 25 may be a processor such as a Central Processing Unit (CPU) or a Digital Signal Processor (DSP). In that case, the processor performs the above-described processing by executing a program stored in a memory (not illustrated).

(Example of Calculation Unit 21)

Figure 5:
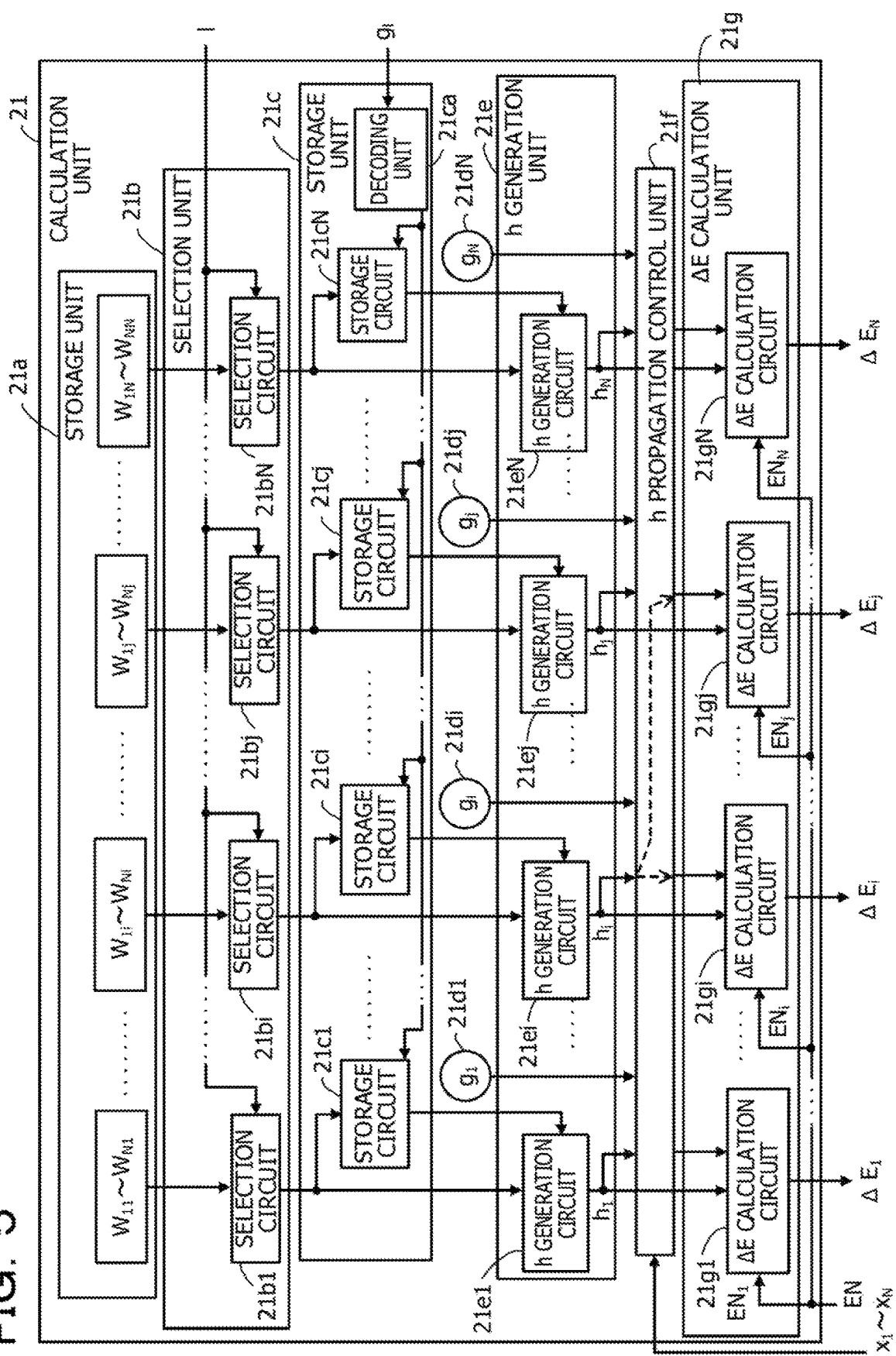
FIG. 5 is a diagram illustrating an example of a calculation unit.

FIG. 5 is a diagram illustrating an example of the calculation unit.

The calculation unit 21 includes a storage unit 21a, a selection unit 21b, a storage unit 21c, holding units 21d1 to 21dN, an h generation unit 21e, an h propagation control unit 21f, and a ΔE calculation unit 21g.

The storage unit 21a holds weight values ($W_{11}$ to $W_{NN}$). $W_{11}$ to $W_{NN}$ are stored in the storage unit 21a by the control unit 25 during the initial setting processing. The storage unit 21a is implemented by using, for example, a register, an SRAM, or the like.

The selection unit 21b includes selection circuits 21b1 to 21bN. Each of the selection circuits 21b1 to 21bN selects and outputs a weight value held in the storage unit 21a on the basis of the index=l output by the identification information calculation unit 23. For example, the selection circuit 21bi selects and outputs $W_{li}$ from among $W_{1i}$ to $W_{Ni}$, and the selection circuit 21bj selects and outputs $W_{lj}$ from among to $W_{Nj}$. As described above, the selection unit 21b has a function of selecting a weight value to be read from the storage unit 21a.

The storage unit 21c includes storage circuits 21c1 to 21cN for holding all rows corresponding to an index for identifying a bit having a value of 1 in a matrix of $W_{11}$ to $W_{NN}$ held by the storage unit 21a, in each group. Furthermore, the storage unit 21c includes a decoding unit 21ca that selects a weight value to be read from the storage unit 21c on the basis of the group index=$g_i$, and outputs a switching signal described later.

Figure 6:
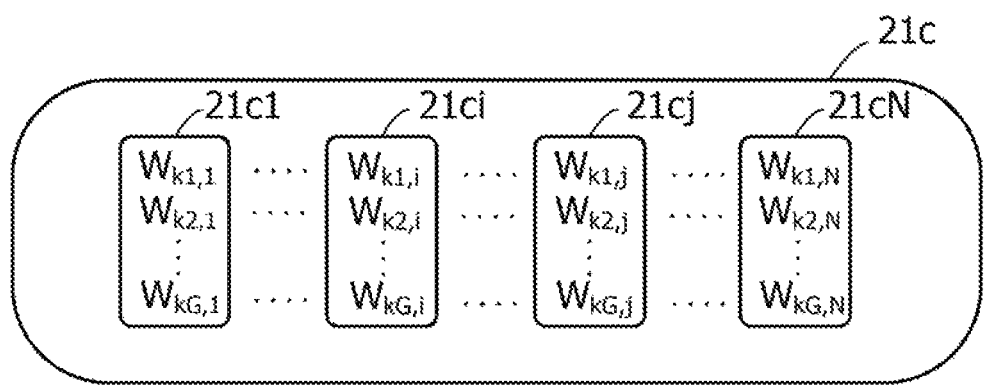
FIG. 6 is a diagram illustrating examples of weight values held in each storage circuit.

FIG. 6 is a diagram illustrating examples of weight values held in each storage circuit.

The storage circuit 21c1 holds weight values ($W_{k1,1}$, $W_{k2,1}$, ..., $W_{kG,1}$) indicating magnitudes of interaction between a bit with the index=1 and bits each having a value of 1 in the respective G groups. The indexes=k1 to kG are indexes of bits each having a value of 1 in the respective groups 1 to G. Furthermore, the storage circuit 21ci holds weight values ($W_{k1,i}$, $W_{k2,i}$, ..., $W_{kG,i}$) indicating magnitudes of interaction between a bit with the index=i and bits with the indexes=k1 to kG. The storage circuit 21cj holds weight values ($W_{k1,j}$, $W_{k2,j}$, ..., $W_{kG,j}$) indicating magnitudes of interaction between a bit with the index=j and the bits with the indexes=k1 to kG. The storage circuit 21cN holds weight values ($W_{k1,N}$, $W_{k2,N}$, ..., $W_{kG,N}$) indicating magnitudes of interaction between a bit with the index=N and the bits with the indexes=k1 to kG.

Figure 7:
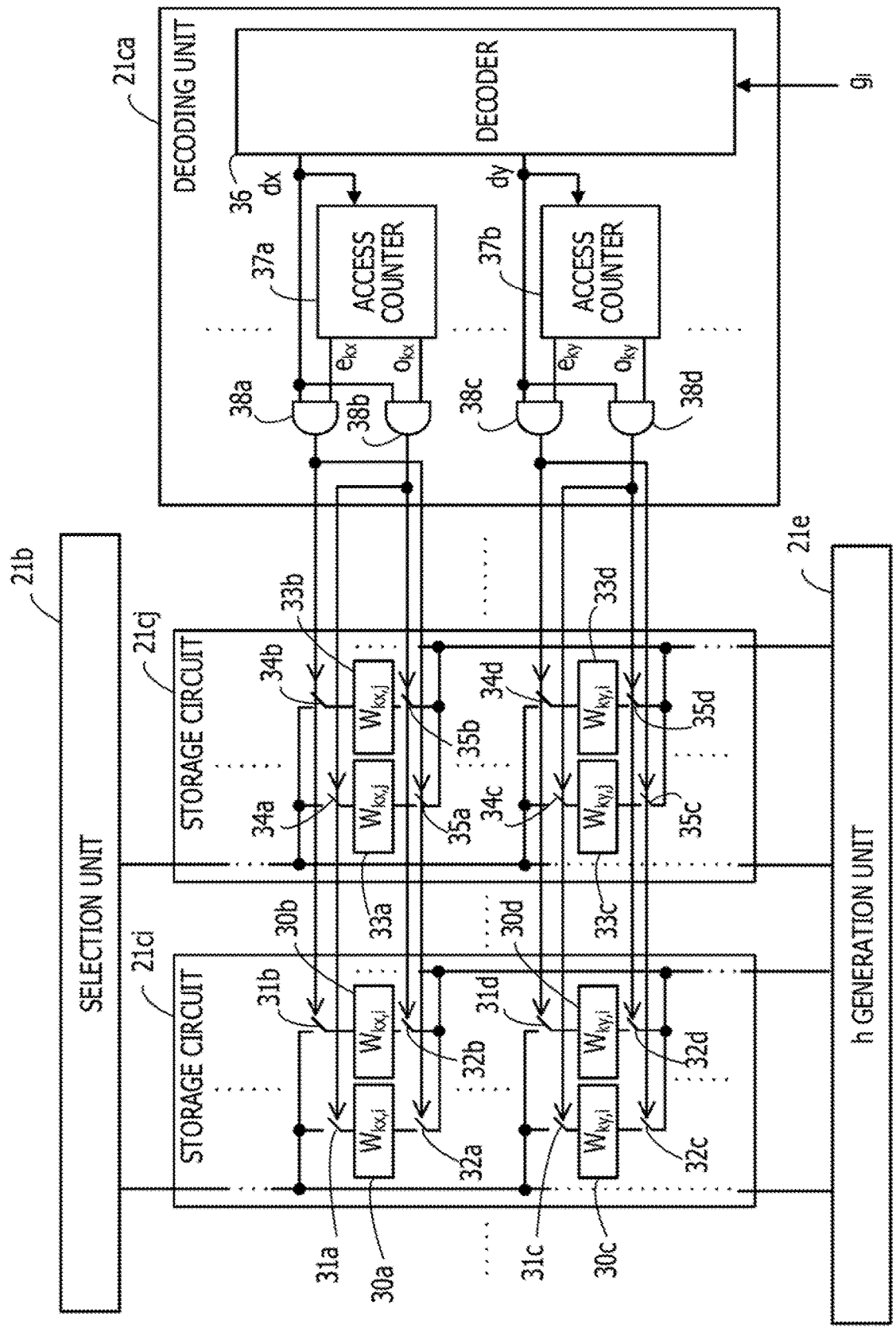
FIG. 7 is a diagram illustrating an example of storage circuits and a decoding unit.

FIG. 7 is a diagram illustrating an example of the storage circuits and the decoding unit.

Although FIG. 7 illustrates circuit examples of the storage circuits 21ci and 21cj among the storage circuits 21c1 to 21cN, other storage circuits can be implemented by similar circuits.

The storage circuit 21ci includes two holding units each holding $W_{k1,i}$, $W_{k2,i}$, ..., and $W_{kG,i}$. For example, holding units 30a and 30b in FIG. 7 each hold $W_{kx,i}$ indicating a magnitude of interaction between the bit with the index=i and a bit with an index=kx having a value of 1 in a group x. Holding units 30c and 30d each hold $W_{ky,i}$ indicating a magnitude of interaction between the bit with the index=i and a bit with an index=ky having a value of 1 in a group y.

The holding units 30a to 30d are implemented by using, for example, registers, SRAMs, or the like.

Moreover, each holding unit of the storage circuit 21ci includes a switch for switching connection/disconnection to/from the selection unit 21b, and a switch for switching connection/disconnection to/from the h generation unit 21e. For example, switches 31a, 31b, 31c, and 31d are switches for switching connection/disconnection between the selection unit 21b and the holding units 30a to 30d. Switches 32a, 32b, 32c, and 32d are switches for switching connection/disconnection between the h generation unit 21e and the holding units 30a to 30d.

The storage circuit 21cj also includes elements similar to those of the storage circuit 21ci. For example, holding units 33a and 33b hold $W_{kx,j}$ indicating a magnitude of interaction between the bit with the index=j and the bit with the index=kx having the value of 1 in the group x. Holding units 33c and 33d hold $W_{ky,j}$ indicating a magnitude of interaction between the bit with the index=j and the bit with the index=ky having the value of 1 in the group y. Furthermore, the storage circuit 21cj includes switches 34a, 34b, 34c, and 34d for switching connection/disconnection between the selection unit 21b and the holding units 33a to 33d, and switches 35a, 35b, 35c, and 35d for switching connection/disconnection between the h generation unit 21e and the holding units 33a to 33d.

The decoding unit 21ca includes a decoder 36 that generates a decode signal for selecting a weight value to be read from the storage unit 21c on the basis of the group index=$g_l$. The decoder 36 sets the decode signal for a group having a group index that matches the group index=$g_l$ to 1, and sets the decode signals for other groups to 0. For example, in a case where the group index=$g_l$ matches a group index of the group x (hereinafter referred to as gx), a decode signal dx becomes 1, and a decode signal dy becomes 0. In a case where the group index=$g_l$ matches a group index of the group y (hereinafter referred to as gy), the decode signal dy becomes 1, and the decode signal dx becomes 0.

The decoding unit 21ca further includes logical product (AND) circuits and access counters that generate switching signals for turning on and off the above-described switches included in the storage circuits 21c1 to 21N on the basis of the decode signals output by the decoder 36. For example, one access counter and two AND circuits are provided for each group. The example of FIG. 7 illustrates an access counter 37a and AND circuits 38a and 38b provided for the group x, and an access counter 37b and AND circuits 38c and 38d provided for the group y.

The access counter 37a counts the number of times the decode signal dx becomes 1, and outputs 1 as a signal $o_{kx}$ and outputs 0 as a signal $e_{kx}$ in a case where the count value is an odd number, and outputs 0 as the signal $o_{kx}$ and outputs 1 as the signal $e_{kx}$ in a case where the count value is an even number. The access counter 37b counts the number of times the decode signal dy becomes 1, and outputs 1 as a signal $o_{ky}$ and outputs 0 as a signal $e_{ky}$ in a case where the count value is an odd number, and outputs 0 as the signal $o_{ky}$ and outputs 1 as the signal $e_{ky}$ in a case where the count value is an even number.

Note that, the access counters 37a and 37b can be implemented by 1-bit counters.

The AND circuit 38a outputs a logical product of the decode signal dx and the signal $e_{kx}$. In a case where an output signal of the AND circuit 38a is 1, the switches 31b, 34b, 32a, and 35a are turned on, and in a case where the output signal of the AND circuit 38a is 0, the switches 31b, 34b, 32a, and 35a are turned off. The AND circuit 38b outputs a logical product of the decode signal dx and the signal $o_{kx}$. In a case where an output signal of the AND circuit 38b is 1, the switches 31a, 34a, 32b, and 35b are turned on, and in a case where the output signal of the AND circuit 38b is 0, the switches 31a, 34a, 32b, and 35b are turned off. The AND circuit 38c outputs a logical product of the decode signal dy and the signal $e_{ky}$. In a case where an output signal of the AND circuit 38c is 1, the switches 31d, 34d, 32c, and 35c are turned on, and in a case where the output signal of the AND circuit 38c is 0, the switches 31d, 34d, 32c, and 35c are turned off. The AND circuit 38d outputs a logical product of the decode signal dy and the signal $o_{ky}$. In a case where an output signal of the AND circuit 38d is 1, the switches 31c, 34c, 32d, and 35d are turned on, and in a case where the output signal of the AND circuit 38d is 0, the switches 31c, 34c, 32d, and 35d are turned off.

FIG. 8 is a diagram illustrating an operation example of the storage unit.

FIG. 8 illustrates an operation example of the holding units 30a and 30b in the storage circuit 21ci of the storage unit 21c. In a case where the group index=$g_l$ matches the group index=gx of the group x, the decode signal dx becomes 1.

In a case where the count value of the access counter 37a is an odd number (in a case where the signal $o_{kx}$ is 1), the switches 31a and 32b are turned on, and the switches 32b and 32a are turned off. Therefore, the holding unit 30a is connected to the selection unit 21b, the holding unit 30a is disconnected from the h generation unit 21e, and writing is performed of $W_{kx,i}$ to the holding unit 30a. On the other hand, the holding unit 30b is disconnected from the selection unit 21b, the holding unit 30b is connected to the h generation unit 21e, and reading is performed of $W_{kx,i}$ from the holding unit 30b.

In a case where the count value of the access counter 37a is an even number (in a case where the signal $e_{kx}$ is 1), the switches 31a and 32b are turned off and the switches 31b and 32a are turned on. Therefore, the holding unit 30a is disconnected from the selection unit 21b, the holding unit 30a is connected to the h generation unit 21e, and reading is performed of $W_{kx,i}$ from the holding unit 30a. On the other hand, the holding unit 30b is connected to the selection unit 21b, the holding unit 30b is disconnected from the h generation unit 21e, and writing is performed of $W_{kx,i}$ to the holding unit 30b.

In a case where the group index=$g_l$ does not match the group index=gx of the group x, the decode signal dx becomes 0, the switches 31a, 31b, 32a, and 32b are turned off, and the holding units 30a and 30b do not operate.

As described above, the decoding unit 21ca sets, as a writing target, one of a first holding unit (holding unit 30a, 33a, or the like) or a second holding unit (holding unit 30b, 33b, or the like) provided for each of the plurality of groups, on the basis of the group index=$g_l$. Then, the decoding unit 21ca sets the other as a reading target.

Figure 9:
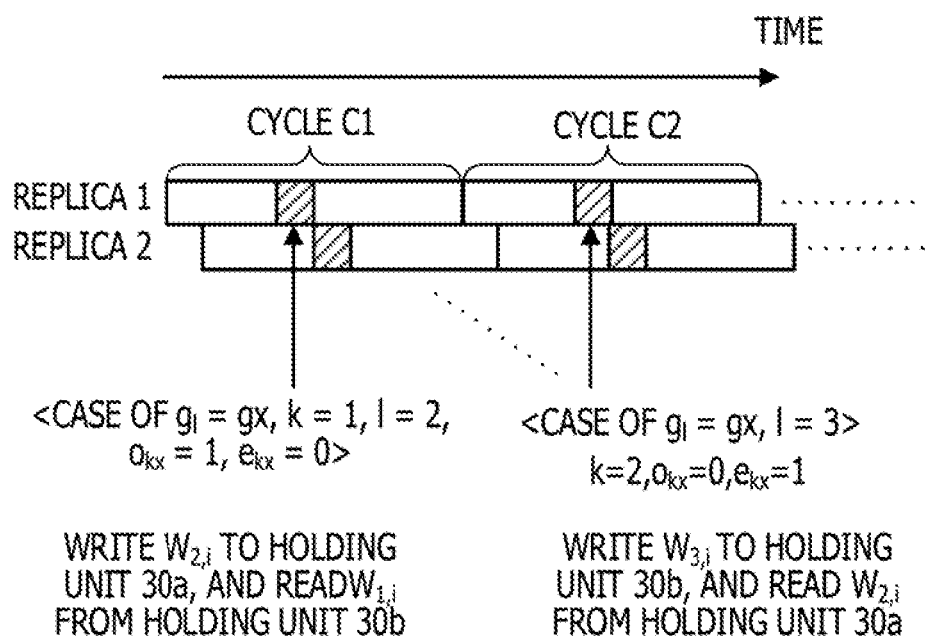
FIG. 9 is a timing chart illustrating an operation example of the storage unit (part 1)
Figure 10:
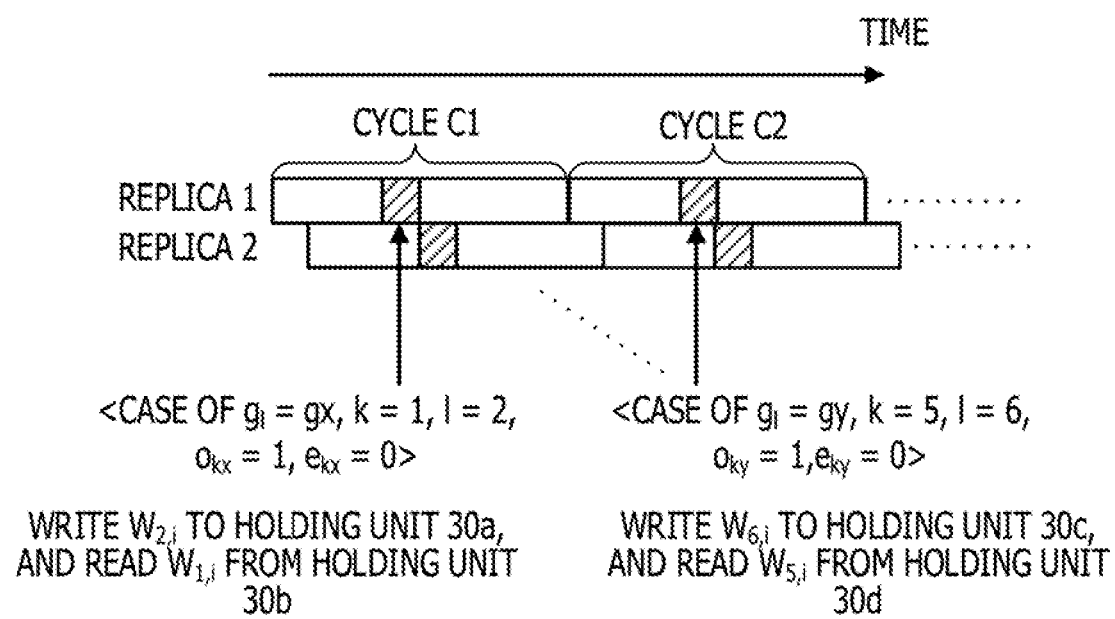
FIG. 10 is a timing chart illustrating an operation example of the storage unit (part 2)

FIGS. 9 and 10 are timing charts each illustrating an operation example of the storage unit.

FIGS. 9 and 10 each illustrate an operation example of the storage unit 21c when the replica exchange method is used and pipeline processing is performed of a plurality of replicas.

FIG. 9 illustrates an operation example of the storage circuit 21ci of the storage unit 21c in a case where the group index=$g_l$ is the same group index=gx in consecutive two times (two cycles) of state update processing.

In a cycle C1, in a case where k output by the identification information calculation unit 23 is 1 and l is 2 and the signal $o_{kx}$=1 and the signal $e_{kx}$=0, $W_{2,i}$ is written to the holding unit 30a, as $W_{kx,i}$ to be read when the group index=gx is supplied to the storage unit 21c next. Furthermore, $W_{1,j}$ is read from the holding unit 30b, as $W_{kx,j}$.

In next cycle C2, among bits belonging to a group of the group index=gx, a bit having a value of 1 is a bit with the index=2 whose value is changed in the cycle C1, so that the index=k output by the identification information calculation unit 23 becomes 2. Furthermore, since the same group index=gx is consecutively supplied to the storage unit 21c, the access counter 37a counts up, and the signals become $o_{kx}$=0 and $e_{kx}$=1. Therefore, $W_{2,i}$ is read from the holding unit 30a, as $W_{kx,i}$. Furthermore, in a case where l output by the identification information calculation unit 23 is 3, $W_{3,i}$ is written to the holding unit 30b, as $W_{kx,i}$ to be read when the group index=gx is supplied next.

FIG. 10 illustrates an operation example of the storage circuit 21ci of the storage unit 21c in a case where the group index=$g_l$ become different group indexes=gx, gy in consecutive two times (two cycles) of state update processing.

Operation in the cycle C1 is the same as that in FIG. 9. In the cycle C2, the group index=gy is supplied to the storage unit 21c, so that writing or reading is performed on the holding units 30c and 30d, in the storage circuit 21ci. In a case where k output by the identification information calculation unit 23 is 5 and l is 6 and signal $o_{ky}$=1 and signal $e_{ky}$=0, $W_{6,i}$ is written to the holding unit 30c, as $W_{ky,i}$ to be read when the group index=gy is supplied next. Furthermore, $W_{5,i}$ is read from the holding unit 30d, as $W_{kx,i}$.

As described above, the storage unit 21c includes the first holding unit (holding unit 30a, 33a, or the like) and the second holding unit (holding unit 30b, 33b, or the like) for each of the plurality of groups. Then, writing is performed of the row of the weight values corresponding to the index=l to the first holding unit, and reading is performed of the row of the weight values corresponding to the index=k from the second holding unit. Then, when the row corresponding to the index=l is read from the storage unit 21a next, the row corresponding to the index=l read is written to the second holding unit. Furthermore, at that time, the row of the weight values held in the first holding unit is read as the row of the weight values corresponding to the index=k.

The holding unit to which writing is performed and the holding unit from which reading is performed are switched and used, whereby writing and reading can be performed of the weight values regarding bits belonging to the same group at the same timing. Therefore, the occurrence can be reduced of the read-write problem.

Note that, in the case where the replica exchange method is performed in the optimization device 20, the weight values held in the storage unit 21c are held independently for each replica.

The description returns to the description of FIG. 5.

Each of the holding units 21d1 to 21dN holds one of the group indexes ($g_1$ to $g_N$). For example, the holding unit 21di holds $g_i$ for identifying a group to which the bit with the index=i belongs. The holding unit 21dj holds $g_j$ for identifying the group to which the bit with the index=j belongs.

Figure 11:
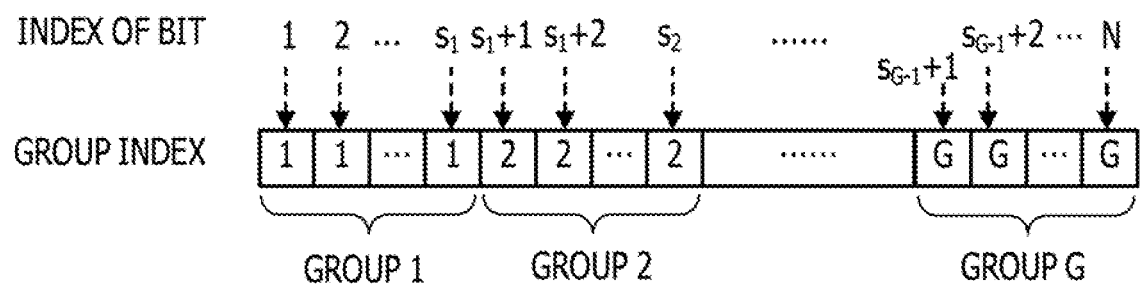
FIG. 11 is a diagram illustrating examples of group index values.

FIG. 11 is a diagram illustrating examples of group index values.

In the example of FIG. 11, the group index of the group 1 to which bits with the indexes 1, 2, . . . , and $s_1$ belong is 1, and the group index of the group 2 to which bits with the indexes $s_1$+1, $s_1$+2, . . . , and $s_2$ belong is 2. Furthermore, the group index of the group G to which bits with the indexes $s_{G-1}$+1, $s_{G-1}$+2, . . . , and N belong is G.

As described above, a smaller value is assigned to a group index of a group to which a bit having a smaller index belongs, for example.

A total storage capacity of the holding units 21d1 to 21dN is determined by N. Each of the holding units 21d1 to 21dN is implemented by using, for example, a register or an SRAM.

In FIG. 5, the h generation unit 21e includes h generation circuits 21e1 to 21eN. Although not illustrated, each of the h generation circuits 21e1 to 21eN includes a holding unit (for example, a register) and holds and updates any one of $h_1$ to $h_N$. For example, the h generation circuit 21ei updates $h_i$ by calculating $h_i - W_{ki} + W_{li}$ using $W_{li}$ selected by the selection circuit 21bi and $W_{ki}$ read from the storage circuit 21ci. The h generation circuit 21ej updates $h_j$ by calculating $h_j - W_{kj} + W_{lj}$ using $W_{lj}$ selected by the selection circuit 21bj and $W_{kj}$ read from the storage circuit 21cj. Initial values of $h_1$ to $h_N$ are, for example, bias values ($b_1$ to $b_N$), and are set by the control unit 25 during the initial setting processing. The h generation circuits 21e1 to 21eN are each implemented by using, for example, an adder or a subtractor in addition to the holding unit.

Note that, in the case where the replica exchange method is performed in the optimization device 20, $h_1$ to $h_N$ are held independently for each replica.

The h propagation control unit 21f controls propagation destinations (supply destinations) of the local field values for bits each having a value of 1 on the basis of $x_1$ to $x_N$ and $g_1$ to $g_N$. For example, in a case where the bit with the index=i having a value of 1 and the bit with the index=j having a value of 0 belong to the same group, the h propagation control unit 21f propagates $h_i$ output by the h generation circuit 21ei to the ΔE calculation circuit 21gi, and also to the ΔE calculation circuit 21gj to which $h_j$ is supplied.

Figure 12:
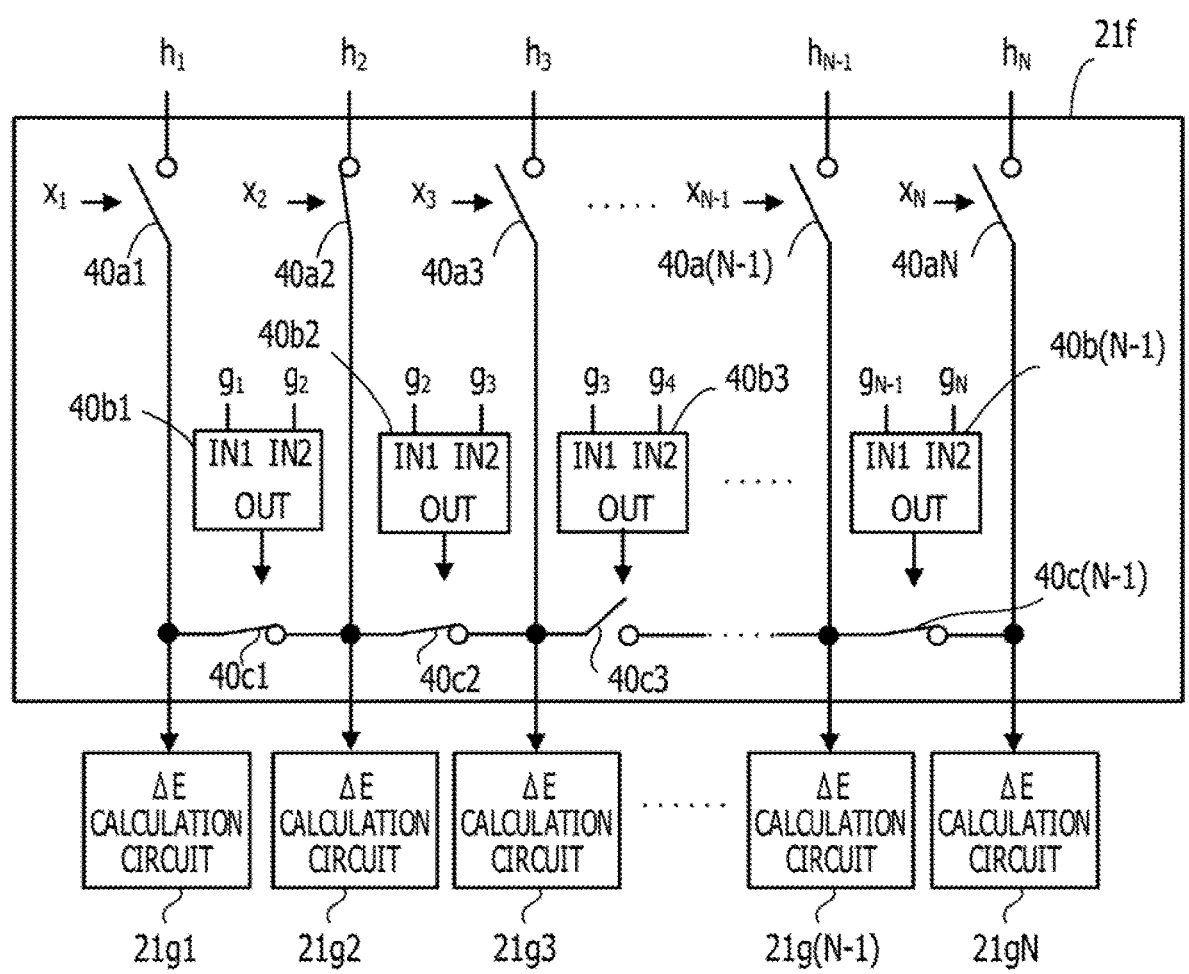
FIG. 12 is a diagram illustrating an example of an h propagation control unit.

FIG. 12 is a diagram illustrating an example of the h propagation control unit.

The h propagation control unit 21f includes switches 40a1, 40a2, 40a3, . . . , 40a(N-1), and 40aN, control signal generation circuits 40b1, 40b2, 40b3, . . . , and 40b(N-1), and switches 40c1, 40c2, 40c3, . . . , and 40c(N-1).

Any one of $x_1$ to $x_N$ is input to each of the switches 40a1 to 40aN, and each switch is turned on in a case where the input state variable is 1, and is turned off in a case where the input state variable is 0. Any one of $h_1, h_2, h_3, . . . , h_{N-1}$, and $h_N$ is input to one terminal of each of the switches 40a1 to 40aN, and the other terminal is connected to any one of ΔE calculation circuits 21g1, 21g2, 21g3, . . . , 21g(N-1), and 21gN. For example, $h_1$ is input to one input terminal of the switch 40a1, and in a case where $x_1$ is 1, the switch 40a1 is turned on, and $h_1$ is supplied to the ΔE calculation circuit 21g1.

Each of the control signal generation circuits 40b1 to 40b(N-1) includes input terminals IN1 and IN2, and an output terminal OUT. To the input terminals IN1 and IN2, group indexes are input of groups to which two bits having adjacent indexes belong respectively, and in a case where both group indexes match each other, the output terminal OUT outputs 1.

Figure 13:
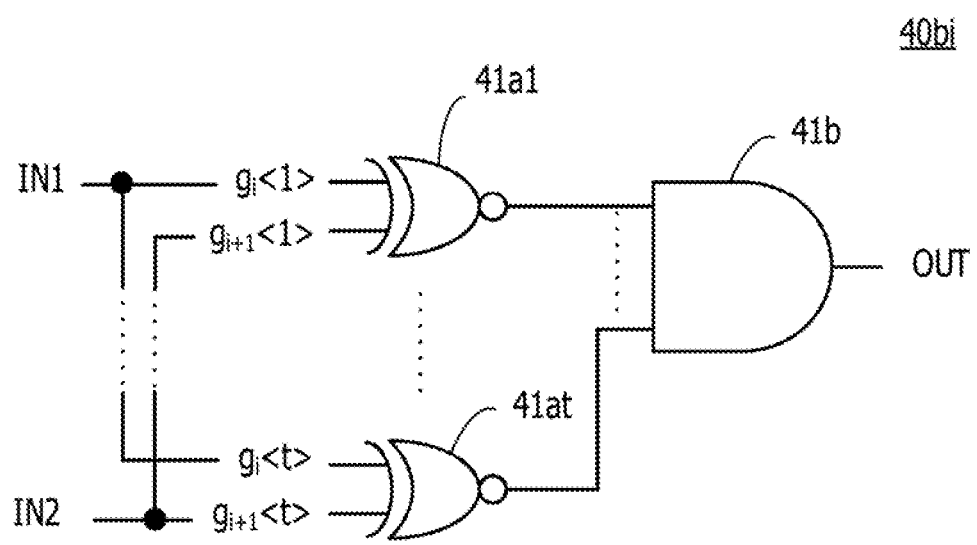
FIG. 13 is a diagram illustrating an example of a control signal generation circuit.

FIG. 13 is a diagram illustrating an example of the control signal generation circuit.

FIG. 13 illustrates an example of the i-th control signal generation circuit 40bi among the control signal generation circuits 40b1 to 40b(N-1) in FIG. 12.

The control signal generation circuit 40bi includes t exclusive NOR (ExNOR) circuits 41a1 to 41at, and an AND circuit 41b. The maximum value of the number of bits for expressing the group index is represented by t. If N=1024, t is at most 10. Each of the ExNOR circuits 41a1 to 41at inputs a value of each one bit of corresponding bits of the input two group indexes, and outputs 1 in a case where both bits match each other. For example, the ExNOR circuit 41a1 inputs least significant bits $g_i$<1> and $g_{i+1}$<1> of $g_i$ and $g_{i+1}$, and outputs 1 in a case where both bits match each other. The ExNOR circuit 41at inputs most significant bits $g_i$<t> and $g_{i+1}$<t> of $g_i$ and $g_{i+1}$, and outputs 1 in a case where both bits match each other.

The AND circuit 41b outputs 1 in a case where outputs of the ExNOR circuits 41a1 to 41at are all 1, and outputs 0 in a case where at least one of the outputs of the ExNOR circuits 41a1 to 41at is 0.

Each of the switches 40c1 to 40c(N−1) in FIG. 12 is connected between the other terminals (sides connected to the ΔE calculation circuit) of any two adjacent switches among the switches 40a1 to 40aN. Furthermore, each of the switches 40c1 to 40c(N−1) is turned on in a case where a value output by any of the control signal generation circuits 40b1 to 40b(N−1) is 1.

For example, the switch 40c1 is connected between the other terminals of the switches 40a1 and 40a2, and is turned on in a case where the control signal generation circuit 40b1 outputs 1.

Each of the switches 40a1 to 40aN and 40c1 to 40c(N−1) is, for example, a transfer gate.

In the h propagation control unit 21f as illustrated in FIG. 12, for example, in a case where bits of indexes=1 to 3 belong to the same group and $x_2=1$ and $x_1=0$ and $x_3=0$, the switches 40a1 and 40a3 are turned off, and the switch 40a2 is turned on. Furthermore, since $g_1=g_2=g_3$, the control signal generation circuits 40b1 and 40b2 output 1, and the switches 40c1 and 40c2 are turned on. Therefore, $h_2$ is supplied to the ΔE calculation circuit 21g2 via the switch 40a2, and is also supplied to the ΔE calculation circuit 21g1 via the switch 40c1, and is supplied to the ΔE calculation circuit 21g3 via the switch 40c2.

Note that, in a case where a bit with an index=4 belongs to a different group from the bits with the indexes=1 to 3, $g_3 \neq g_4$ is satisfied, so that the control signal generation circuit 40b3 outputs 0, and the switch 40c3 is turned off.

The description returns to the description of FIG. 5.

The ΔE calculation unit 21g includes the ΔE calculation circuits 21g1 to 21gN. The ΔE calculation circuits 21g1 to 21gN calculates $\Delta E_1$ to $\Delta E_N$ of when transition is performed from one state satisfying the one-hot constraint to another state satisfying the one-hot constraint by the state transition of the Hamming distance=2, by using $h_1$ to $h_N$.

To each of the ΔE calculation circuits 21g1 to 21gN, any one of $h_1$ to $h_N$ is directly supplied from any one of the h generation circuits 21e1 to 21eN. Moreover, to a ΔE calculation circuit to which a local field value for a bit having a value of 0 is supplied from any one of the h generation circuits 21e1 to 21eN, a local field value for a bit having a value of 1 belonging to the same group as that of the bit having the value of 0 is propagated by the h propagation control unit 21f.

Figure 14:
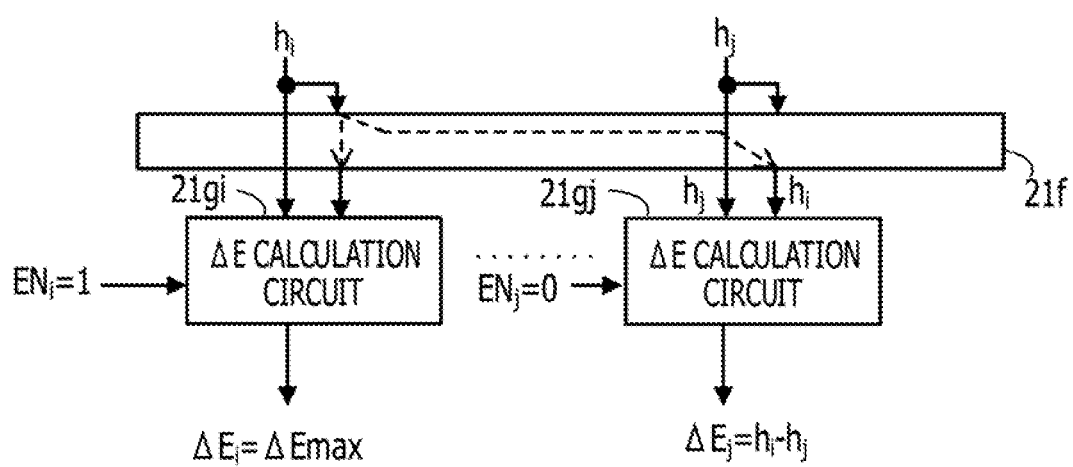
FIG. 14 is a diagram illustrating a processing example by ΔE calculation circuits.

FIG. 14 is a diagram illustrating a processing example by the ΔE calculation circuits.

In a certain group, to the ΔE calculation circuit 21gj to which $h_j$ for a bit having a value of 0 is directly supplied from the h generation circuit 21ej, $h_i$ for a bit having a value of 1 belonging to the same group as that of the bit having the value of 0 is propagated by the h propagation control unit 21f.

The ΔE calculation circuit 21gj calculates $\Delta E_j$ due to a change of $x_i$ from 1 to 0 and a change of $x_j$ from 0 to 1, by calculating $h_i - h_j$.

The ΔE calculation circuit 21gi is supplied with $h_i$. As described in the description of the optimization device 10 of the first embodiment, to avoid the state transition of the Hamming distance=2 by the same bit, the ΔE calculation circuit 21gi is controlled by a control signal $EN_i=1$ to output ΔEmax that is the predetermined positive value. ΔEmax is, for example, a positive maximum value that can be generated by the optimization device 20. Note that, a control signal $EN_j=0$ is supplied to the ΔE calculation circuit 21gj, and a function of outputting ΔEmax is disabled. For example, the control signal $EN_i=1$ is supplied to the ΔE calculation circuit 21gi that directly receives $h_i$ for a bit having a value of 1, and the control signal $EN_j=0$ is supplied to the ΔE calculation circuit 21gj that directly receives $h_j$ for a bit having a value of 0. The control signals $EN_i$ and $EN_j$ are generated by the update unit 24 on the basis of $x_1$ to $x_N$.

(Example of Selection Circuit 22)

Figure 15:
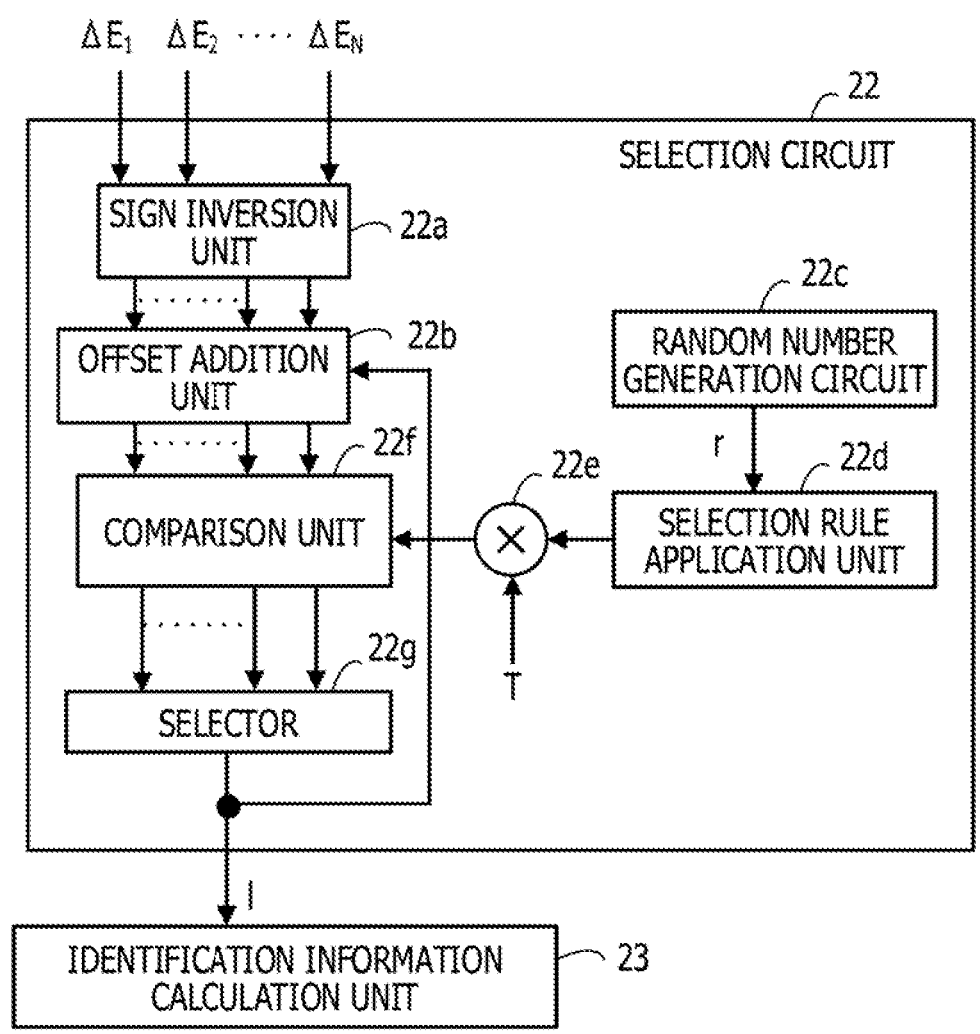
FIG. 15 is a diagram illustrating an example of a selection circuit.

FIG. 15 is a diagram illustrating an example of the selection circuit.

The selection circuit 22 includes a sign inversion unit 22a, an offset addition unit 22b, a random number generation circuit 22c, a selection rule application unit 22d, a multiplier 22e, a comparison unit 22f, and a selector 22g.

The sign inversion unit 22a inverts the sign by multiplying each of $\Delta E_1, \Delta E_2, \ldots,$ and $\Delta E_N$ by −1.

The offset addition unit 22b adds an offset value to each of output values ($-\Delta E_1$ to $-\Delta E_N$) of the sign inversion unit 22a. The offset addition unit 22b increases the offset value when a flag output by the selector 22g described later indicates that update is not allowed (for example, when no state transition occurs). On the other hand, when the flag indicates that update is allowed (for example, when a state transition occurs), the offset addition unit 22b sets the offset value to 0. When the offset value increases, the state transition is likely to be allowed, and in a case where the current state is in a local solution, escape from the local solution is promoted.

The random number generation circuit 22c generates a uniform random number (r) of greater than or equal to 0 and less than or equal to 1.

The selection rule application unit 22d outputs a value based on a selection rule (Metropolis method or Gibbs method) for performing the simulated annealing or the replica exchange method.

For example, in a case where the simulated annealing is performed, if an allowable probability A(ΔE, T) of a state transition that causes a certain energy change is determined as expressions (9) and (10) below, it has been proved that the state reaches the optimal solution in the limit of the time (the number of iterations) infinity.

[Math. 9]

$$A(\Delta E, T) = f(-\Delta E/T) \qquad (9)$$

[Math. 10]

$$f(-\Delta E/T) = \begin{cases} \min[1, \exp(-\Delta E/T)] & \text{Metropolis method} \\ 1/[1 + \exp(\Delta E/T)] & \text{Gibbs method} \end{cases} \qquad (10)$$

In the expressions (9) and (10), T is the temperature parameter described above.

In a case where the allowable probability A(ΔE, T) expressed by the expression (9) is used, if a steady state is reached after sufficient repetition, an occupation probability of each state follows a Boltzmann distribution for a thermal equilibrium state in thermodynamics. Then, when the temperature is gradually lowered from a high temperature, an occupation probability of a low energy state increases, so that the low energy state is desirably obtained when the temperature is sufficiently lowered. Since this state is very similar to a state change of when a material is annealed, this method is referred to as simulated annealing. At this time, stochastic occurrence of a state transition that increases energy corresponds to thermal excitation in physics.

A circuit that outputs a flag (=1) indicating that a state transition is allowed that causes ΔE with the allowable probability A(ΔE, T), can be implemented by a comparator that outputs a value based on a result of comparison between $f(-\Delta E/T)$ in the expressions (9) and (10), and the uniform random number r.

However, the same function can also be implemented by performing the following modification. A magnitude relationship is not changed even if the same monotonically increasing function is applied to two numbers. Thus, an output of the comparator is not changed even if the same monotonically increasing function is applied to two inputs of the comparator. For example, it is possible to use an inverse function $f^{-1}(-\Delta E/T)$ of $f(-\Delta E/T)$ as a monotonically increasing function to be applied to $f(-\Delta E/T)$, and to use $f^{-1}(r)$ in which $-\Delta E/T$ of $f^{-1}(-\Delta E/T)$ is r as a monotonically increasing function to be applied to the uniform random number. In that case, it can be seen that a circuit having a function similar to that of the comparator described above may be a circuit that outputs 1 when $-\Delta E/T$ is greater than $f^{-1}(r)$. Moreover, since T is positive, the circuit may be a circuit that outputs 1 when $-\Delta E$ is greater than $T \cdot f^{-1}(r)$.

The selection rule application unit 22d outputs a value of $f^{-1}(r)$ by using a conversion table for converting an input uniform random number into a value of $f^{-1}(r)$ described above. In a case where the Metropolis method is applied, $f^{-1}(r)$ is $\log(r)$. The conversion table is stored in a memory, for example, a Random Access Memory (RAM), a flash memory, or the like.

The multiplier 22e outputs a product $(T \cdot f^{-1}(r))$ of T and $f^{-1}(r)$. $T \cdot f^{-1}(r)$ corresponds to thermal excitation energy.

The comparison unit 22f compares an addition result by the offset addition unit 22b for each of $\Delta E_1$ to $\Delta E_N$ with $T \cdot f^{-1}(r)$, and outputs 1 as a flag for an addition result greater than $T \cdot f^{-1}(r)$. Furthermore, the comparison unit 22f outputs 0 as a flag for an addition result less than or equal to $T \cdot f^{-1}(r)$.

On the basis of the flag for each of $\Delta E_1$ to $\Delta E_N$, the selector 22g outputs the index=l of the bit allowed to be updated and the flag. In a case where there is a plurality of bits allowed to be updated, an index of one of the bits is output as the index=l on the basis of the random number. Even in a case where there is no bit allowed to be updated, an index of any bit is output. In that case, the flag output by the selector 22g is 0.

For example, the selector 22g outputs an N-bit value in which a value of the l-th bit is 1 and values of the other bits are 0 as the index=l.

Note that, also the selection circuit 15 of the optimization device 10 of the first embodiment illustrated in FIG. 1 can be implemented by using the circuit as illustrated in FIG. 15.

(Example of Identification Information Calculation Unit 23)

Figure 16:
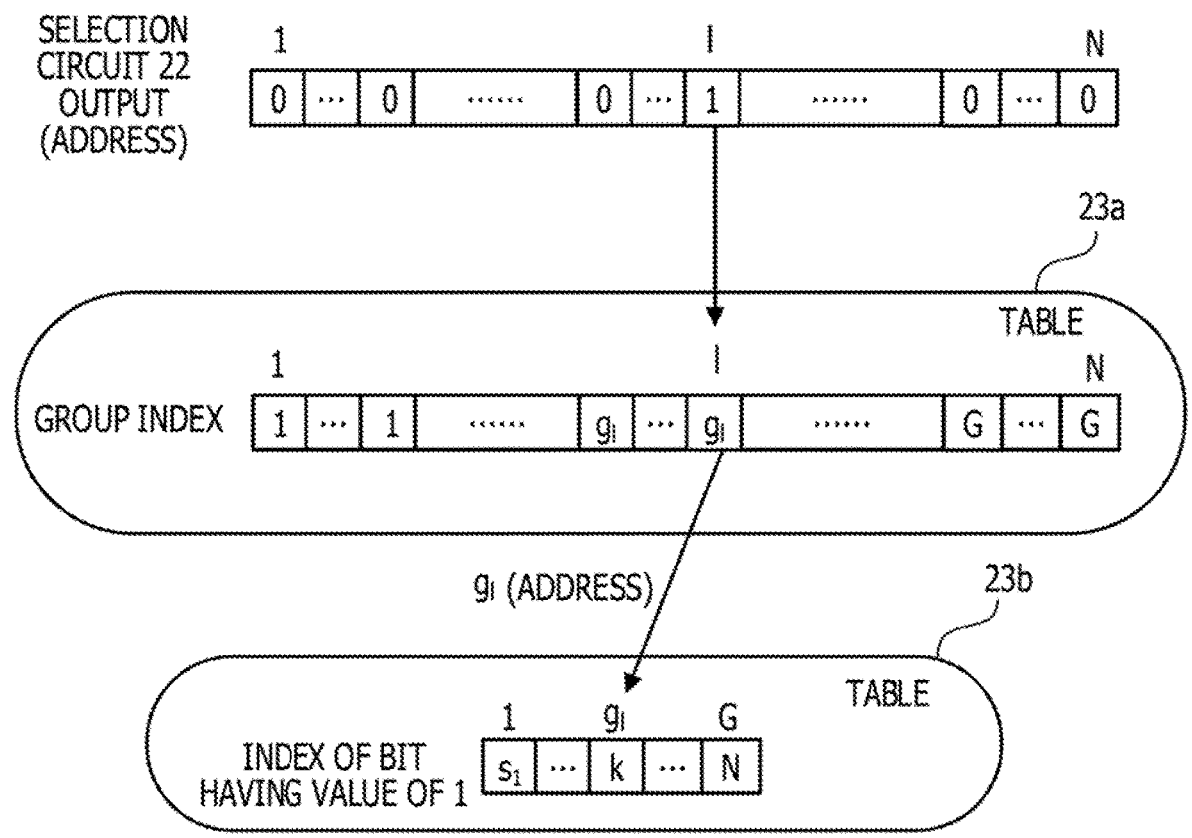
FIG. 16 is a diagram illustrating an example of an identification information calculation unit.

FIG. 16 is a diagram illustrating an example of the identification information calculation unit.

In the example of FIG. 16, the identification information calculation unit 23 outputs $g_l$ that is a group index, and k that is an index of a bit having a value of 1, by using tables 23a and 23b. The tables 23a and 23b are stored in a memory, for example, a RAM, a flash memory, or the like.

In the table 23a, group indexes of groups to which the respective N bits belong are arranged in ascending order.

The identification information calculation unit 23 uses the N-bit value that is output as the index=l by the selection circuit 22 and in which the value of the l-th bit is 1 and the values of the other bits are 0, as an address for accessing the group index of the table 23a. In a case where the value of the l-th bit is 1, the l-th group index=$g_l$ is output, in the table 23a.

In the table 23b, indexes of bits each having a value of 1 in each of the G groups are arranged in ascending order. In the example of FIG. 16, an index of a bit having a value of 1 belonging to a group of the group index=1 is $s_1$, and an index of a bit having a value of 1 belonging to a group of the group index=G is N. Furthermore, an index of a bit having a value of 1 belonging to a group of the group index=$g_l$ is k.

The identification information calculation unit 23 uses the group index=$g_l$ output by using the table 23a as an address for accessing the index of the table 23b. The identification information calculation unit 23 outputs the $g_l$-th index=k among the indexes arranged in the table 23a.

The table 23b is updated each time the state update processing is performed.

Note that, also the identification information calculation unit 16 of the optimization device 10 of the first embodiment illustrated in FIG. 1 may output the index=k and the group index=$g_l$ by using the tables 23a and 23b illustrated in FIG. 16.

(Overall Operation Example of Optimization Device 20)

Figure 17:
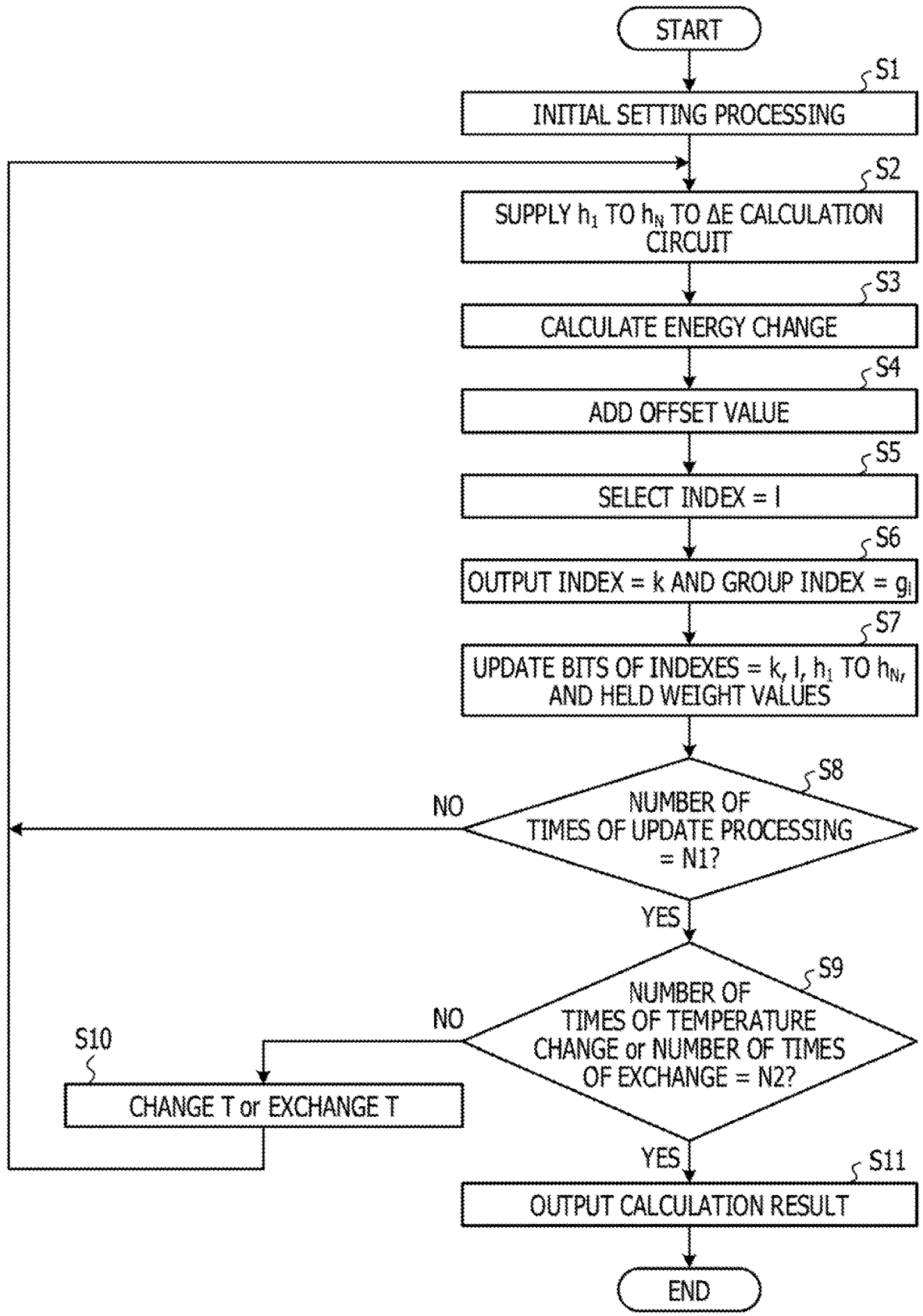
FIG. 17 is a flowchart illustrating a processing flow of an example of the optimization device of the second embodiment.

FIG. 17 is a flowchart illustrating a processing flow of an example of the optimization device of the second embodiment.

Figure 18:
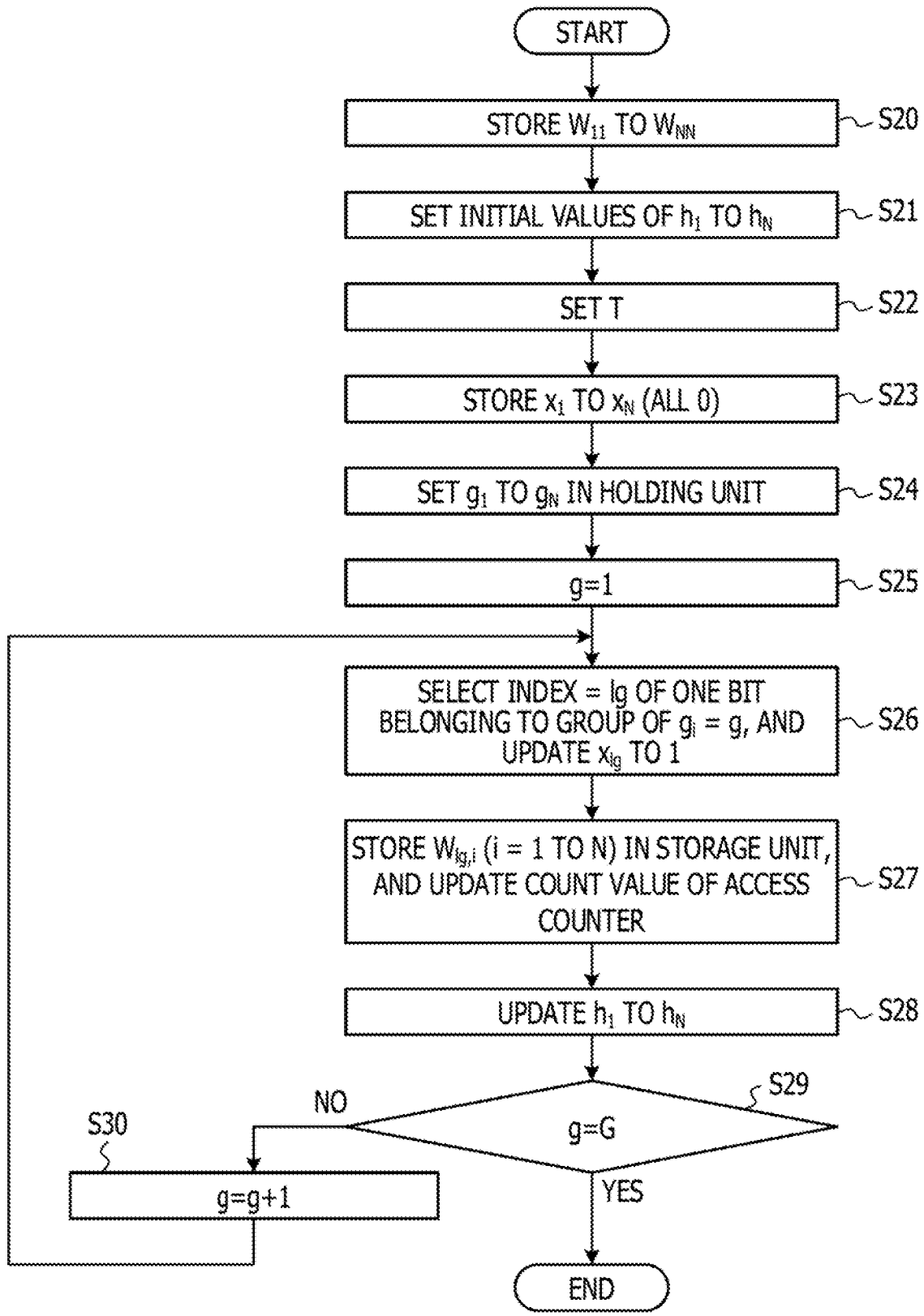
FIG. 18 is a flowchart illustrating a flow of an example of initial setting processing.

Furthermore, FIG. 18 is a flowchart illustrating a flow of an example of the initial setting processing.

The initial setting processing in step S1 in FIG. 17 includes, for example, processing as illustrated in FIG. 18.

The control unit 25 stores $W_{11}$ to $W_{NN}$ received from the control device 26 in the storage unit 21a of the calculation unit 21 (step S20).

Furthermore, the control unit 25 sets the initial values (for example, bias values) of $h_1$ to $h_N$ received from the control device 26 in the h generation circuits 21e1 to 21eN of the calculation unit 21 (step S21).

Moreover, in the case where the simulated annealing is performed, the control unit 25 sets the temperature parameter T (initial value) in the selection circuit 22 on the basis of an annealing condition received from the control device 26. In the case where the replica exchange method is performed, the control unit 25 sets different values T received from the control device 26 for respective replicas (step S22).

Furthermore, the control unit 25 stores $x_1$ to $x_N$ (all 0) in the storage unit 24a (step S23) and sets $g_1$ to $g_N$ in the holding units 21d1 to 21dN (step S24). In the case where the replica exchange method is performed, $x_1$ to $x_N$ are stored independently for each replica.

Thereafter, the control unit 25 sets a variable g to g=1 (step S25). Then, the control unit 25 selects an index=lg of one bit belonging to the group of $g_i$=g, updates $x_{lg}$ among $x_1$ to $x_N$ to 1, and stores $x_{lg}$ in the storage unit 24a (step S26). The index=lg may be an index of a bit randomly selected from bits belonging to the group of $g_i$=g, or may be an index of a bit at a specific position (for example, a selected bit of a head group).

Then, the control unit 25 stores weight values ($W_{lg,i}$ (i=1 to N)) indicating magnitudes of interaction between the bit with the index=lg and the bits with the indexes=1 to N in the storage unit 21c, and causes the count value of the access counter to be updated (step S27). For example, in a case where the group index=$g_l$ is the group index=gx of the group x, the control unit 25 causes the access counter 37a illustrated in FIG. 7 to count up the count value.

Furthermore, the control unit 25 updates $h_1$ to $h_N$ along with the update of $x_{lg}$ (step S28). Since the change in $h_i$ (i=1 to N) of when $x_{lg}$ changes from 0 to 1 is +$W_{lg,i}$, $h_i$ is updated as $h_i$=$h_i$+$W_{lg,i}$. The updated $h_1$ to $h_N$ are held in holding units (not illustrated) in the h generation circuits 21e1 to 21eN. In the case where the replica exchange method is performed in the optimization device 20, $h_1$ to $h_N$ are held independently for each replica.

Next, the control unit 25 determines whether or not g=G is satisfied (step S29), and in a case where g=G is satisfied, ends the initial setting processing, and in a case where g=G is not satisfied, sets g=g+1 (step S30), and repeats the processing from step S26.

Note that, in a case where the identification information calculation unit 23 uses the table 23b as illustrated in FIG. 16, the control unit 25 can create the table 23b by arranging the index=lg obtained each time the processing of step S26 is performed.

Note that, the order of the processing in the initial setting processing is not limited to the above example, and the order may be appropriately changed.

After the above-described initial setting processing is ended, the h propagation control unit 21f supplies $h_1$ to $h_N$ to the ΔE calculation circuits 21g1 to 21gN on the basis of $x_1$ to $x_N$ and $g_1$ to $g_N$ (step S2). For example, in a case where the bit with the index=i having a value of 1 and the bit with the index=j having a value of 0 belong to the same group, the h propagation control unit 21f supplies $h_i$ output by the h generation circuit 21ei to the ΔE calculation circuit 21gi, and also to the ΔE calculation circuit 21gj.

Thereafter, calculation is performed of $ΔE_1$ to $ΔE_N$ as described above by the ΔE calculation circuits 21g1 to 21gN (step S3). Then, in the selection circuit 22 as illustrated in FIG. 15, addition of the offset value is performed (step S4), and then the selection of the index=l is performed (step S5). The identification information calculation unit 23 outputs the index=k and the group index=$g_l$ by the above-described processing (step S6). Note that, in a case where the identification information calculation unit 23 uses the table 23b as illustrated in FIG. 16, the identification information calculation unit 23 reads the index=k from the table 23b, and then overwrites the same storage area with the index=l.

Thereafter, the following update processing is performed (step S7). The update unit 24 updates the value ($x_k$) of the bit with the index=k stored in the storage unit 24a from 1 to 0, and updates the value ($x_l$) of the bit with the index=l from 0 to 1. Furthermore, the h generation unit 21e reads the row of the weight values selected by the selection unit 21b on the basis of the index=l and the row of the weight values held in the storage unit 21a at the same timing, and updates $h_1$ to $h_N$. Moreover, the storage unit 21c updates the held weight values on the basis of the group index=$g_l$.

Thereafter, the control unit 25 determines whether or not the number of times of state update processing has reached a predetermined number of times N1 (step S8). In a case where the number of times of update processing has not reached the predetermined number of times N1, the processing of steps S2 to S7 is repeated.

In a case where the number of times of update processing has reached the predetermined number of times N1, when the simulated annealing is executed, the control unit 25 determines whether or not the number of times of change of T (number of times of temperature change) has reached a predetermined number of times N2. When the replica exchange method is executed, the control unit 25 determines whether or not the number of times of exchange of the value of T between each of the replicas has reached the predetermined number of times N2 (step S9).

In a case where the number of times of temperature change has not reached the predetermined number of times N2 when the simulated annealing is executed, the control unit 25 changes T (lowers the temperature). In a case where the number of times of exchange has not reached the predetermined number of times N2 when the replica exchange method is executed, the control unit 25 exchanges T between the replicas for which adjacent temperatures are set, with the predetermined probability, on the basis of the energy of each replica (step S10). The manner of changing the values of the predetermined numbers of times N1 and N2, and T (how much the values are reduced at once, and the like) is determined on the basis of annealing conditions and the like. After the processing in step S10, the processing from step S2 is repeated.

In a case where the number of times of temperature change or the number of times of exchange has reached the predetermined number of times N2, the following calculation result output processing is performed (step S11), and operation of the optimization device 20 is ended.

In a case where the number of times of temperature change has reached the predetermined number of times N2 when the simulated annealing is executed, the control unit 25 acquires the value (variable $x_i$ (i=1 to N)) of each bit at that time from the storage unit 24a, and transmits (outputs) the value to the control device 26, as a solution (calculation result). Note that, the update unit 24 may update the energy on the basis of the energy change corresponding to the indexes=k, l, and hold the minimum energy at each update time, and the state of when the minimum energy is obtained (the state at the time of the minimum energy). In that case, when the number of times of temperature change reaches the predetermined number of times N2, the control unit 25 may acquire the state at the time of the minimum energy held by the update unit 24 and output the state as a solution.

On the other hand, when the replica exchange method is executed, the control unit 25 causes the storage unit 24a of the update unit 24 to hold the minimum energy and the state at the time of the minimum energy in each replica. Then, during the processing of step S11, the control unit 25 acquires the state at the time of the minimum energy among the energies obtained so far in all the replicas from the update unit 24, and causes the control device 26 to output the state as a solution.

Note that, a display device may be connected to the control unit 25. In that case, the control unit 25 may display the calculation result on the display device.

Also in the optimization device 20 of the second embodiment as described above, effects can be obtained similar to those of the optimization device 10 of the first embodiment.

MODIFICATIONS

The optimization device 20 of the second embodiment performs a state transition between the states satisfying the one-hot constraint, but may have a function of performing a state transition of the Hamming distance=1 as in the conventional optimization device. In this case, in the optimization device 20, a function of performing the state transition between the states satisfying the one-hot constraint (hereinafter, referred to as a one-hot constraint support function) is disabled, and a configuration is added for executing the function of performing the state transition of the Hamming distance=1.

Figure 19:
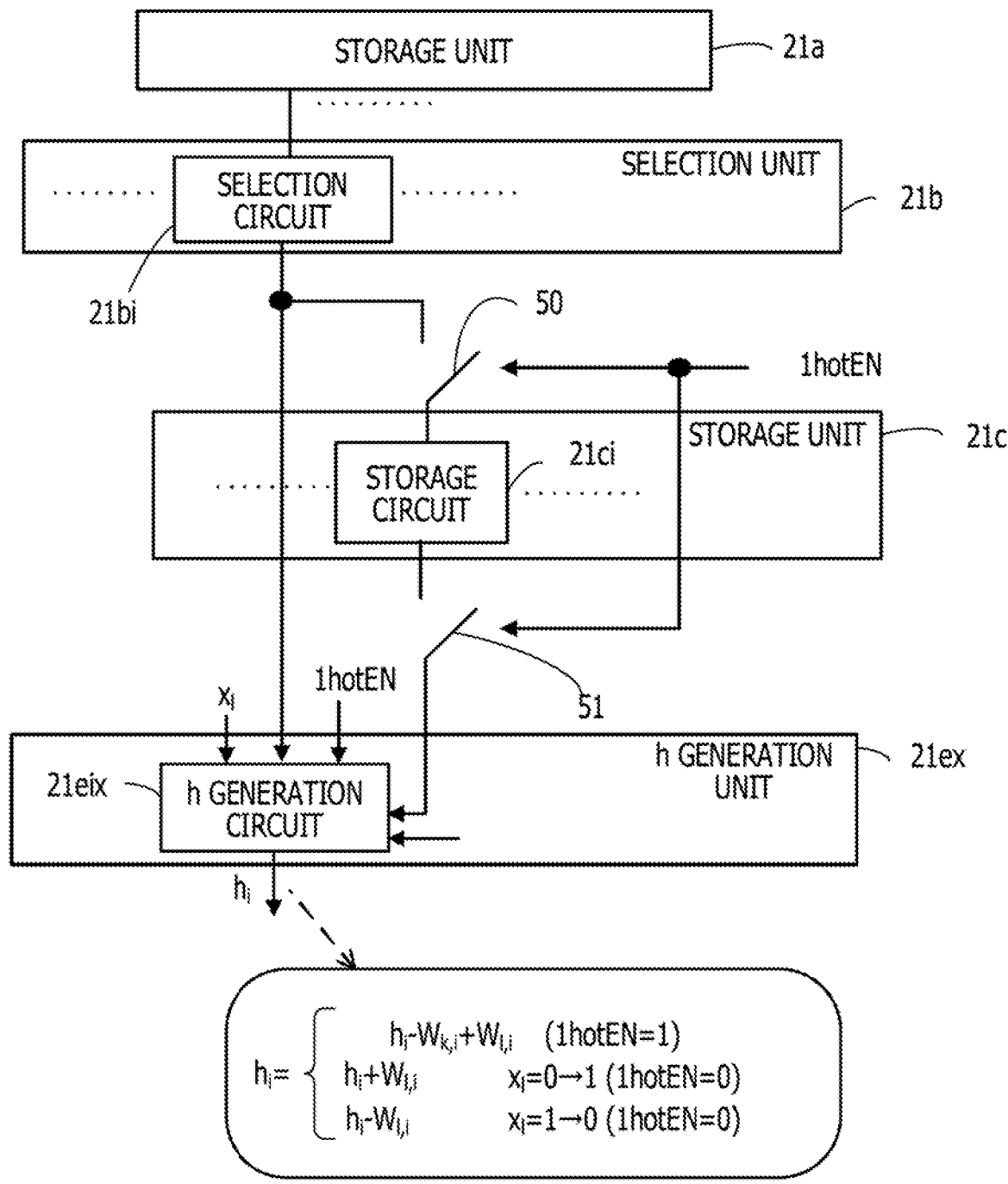
FIG. 19 is a diagram illustrating a part of an optimization device having a configuration that disables a one-hot constraint support function.

FIG. 19 is a diagram illustrating a part of an optimization device having a configuration that disables the one-hot constraint support function. In FIG. 19, the same elements as those illustrated in FIG. 5 are denoted by the same reference numerals. In FIG. 19, the storage circuit 21ci of the storage unit 21c is connected to the selection circuit 21bi of the selection unit 21b via a switch 50, and further connected to an h generation circuit 21*eix* of an h generation unit 21*ex* via a switch 51. The switches 50 and 51 are turned on or off by an enable signal (illustrated as 1*hot*EN).

Although not illustrated, similar switches are connected to other storage circuits of the storage unit 21*c*.

In a case where the one-hot constraint support function is disabled, each of the above-described switches are turned off, whereby the storage unit 21*c* is disconnected from the selection unit 21*b* (and the storage unit 21*a*) and the h generation unit 21*ex*. In a case where the one-hot constraint support function is enabled, each of the above-described switches are turned on, whereby the storage unit 21*c* is connected to the selection unit 21*b* (and the storage unit 21*a*) and the h generation unit 21*ex*. In the following, it is assumed that when 1*hot*EN=1, the above-described function is enabled, and when 1*hot*EN=0, the above-described function is disabled, and the state transition of Hamming distance=1 is performed. The enable signal 1*hot*EN is output by, for example, the control unit 25 illustrated in FIG. 4.

The enable signal 1*hot*EN is also input to the h generation circuit 21*eix* of the h generation unit 21*ex*, and when 1*hot*EN=1, the h generation circuit 21*eix* updates $h_i$ by calculating $h_i - W_{ki} + W_{li}$, similarly to the h generation circuit 21*ei* illustrated in FIG. 5. On the other hand, when 1*hot*EN=0, the change in $h_i$ is determined by $x_l$. In a case where $x_l$ after the update is 1 ($x_l$ before the update is 0), the change is $+W_{li}$, and in a case where $x_l$ after the update is 0 ($x_l$ before the update is 1), the change is $-W_{li}$. Thus, the h generation circuit 21*eix* receives, for example, $x_l$ after the update from the update unit 24, and when 1*hot*EN=0, updates the $h_i$ by calculating $h_i + W_{li}$; in a case where $x_l$ after the updated is 1, and updates $h_i$ by calculating $h_i - W_{li}$ in a case where $x_l$ after the update is 0.

Figure 20:
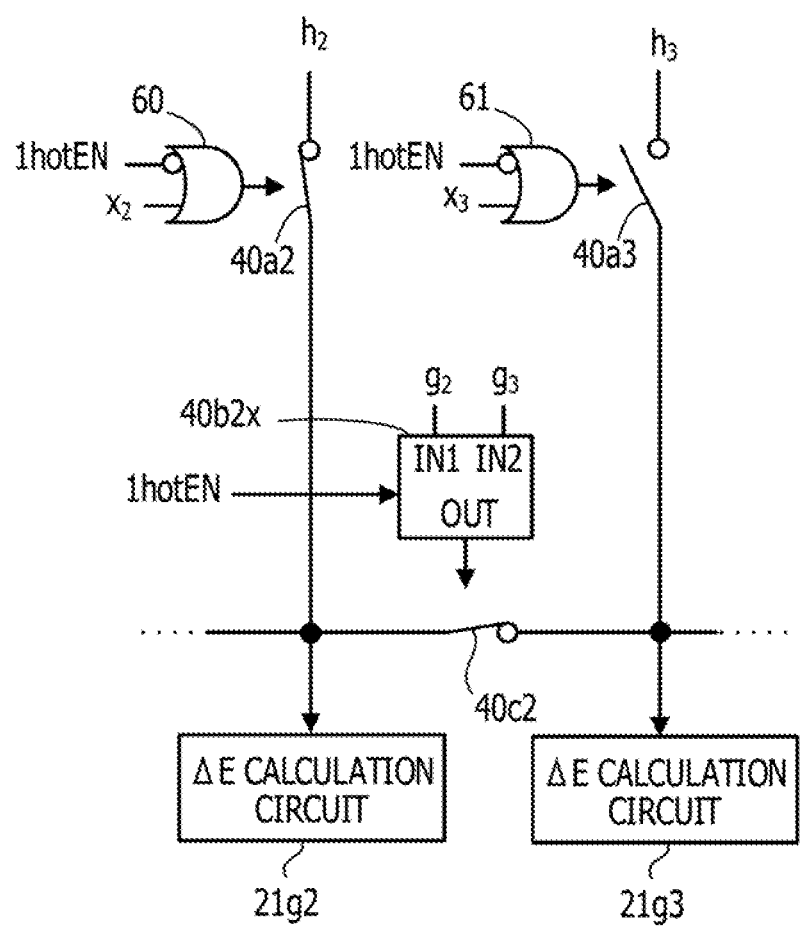
FIG. 20 is a diagram illustrating an example of an h propagation control unit in the optimization device having the configuration that disables the one-hot constraint support function.

FIG. 20 is a diagram illustrating an example of an h propagation control unit in the optimization device having the configuration that disables the one-hot constraint support function. In FIG. 20, the same elements as those illustrated in FIG. 12 are denoted by the same reference numerals.

FIG. 20 illustrates OR circuits 60 and 61 that generate control signals for the switches 40*a*2 and 40*a*3. A value (1 or 0) of 1*hot*EN is inverted (changed from 1 to 0 or 0 to 1) and input to one input terminal of the OR circuit 60. To the other input terminal of the OR circuit 60, $x_2$ is input. The value of 1*hot*EN is inverted and input to one input terminal of the OR circuit 61, and $x_3$ is input to the other input terminal of the OR circuit 61.

The OR circuit 60 outputs $x_2$ as the control signal in the case of 1*hot*EN=1, and outputs 1 regardless of $x_2$ in the case of 1*hot*EN=0, and turns on the switch 40*a*2. The OR circuit 61, in the case of 1*hot*EN=1, outputs $x_3$ as the control signal, and in the case of 1*hot*EN=0, outputs 1 regardless of $x_3$ and turns on the switch 40*a*3.

The control signals are also supplied to the switches other than the switches 40*a*2 and 40*a*3 among the switches 40*a*1 to 40*a*N illustrated in FIG. 12, by OR circuits similar to the OR circuits 60 and 61 illustrated in FIG. 20.

Furthermore, FIG. 20 illustrates a control signal generation circuit 40*b*2*x* instead of the control signal generation circuit 40*b*2 illustrated in FIG. 12. To the control signal generation circuit 40*b*2*x*, $g_2$ and $g_3$ are input, and 1*hot*EN is also input. The control signal generation circuit 40*b*2*x* outputs 1 to turn on the switch 40*c*2 in a case where 1*hot*EN is 1 and $g_2 = g_3$, and outputs 0 to turn off the switch 40*c*2 in a case where 1*hot*EN is 1 and $g_2 \neq g_3$, and the control signal generation circuit 40*b*2*x* outputs 0 to turn off the switch 40*c*2 regardless of the relationship between $g_2$ and $g_3$ in a case where 1*hot*EN is 0.

The control signal generation circuit 40*b*2*x* can be implemented by adding an input terminal for receiving 1*hot*EN to the AND circuit 41*b* of the control signal generation circuit 40*bi* illustrated in FIG. 13.

The elements as described above are added to the h propagation control unit 21*f*, whereby each of the ΔE calculation circuits 21*g*1 to 21*g*N is supplied with one corresponding local field value, in the case of 1*hot*EN=0. For example, $h_j$ is supplied to the ΔE calculation circuit 21*gj*, and $h_i$ is not supplied.

Figure 21:
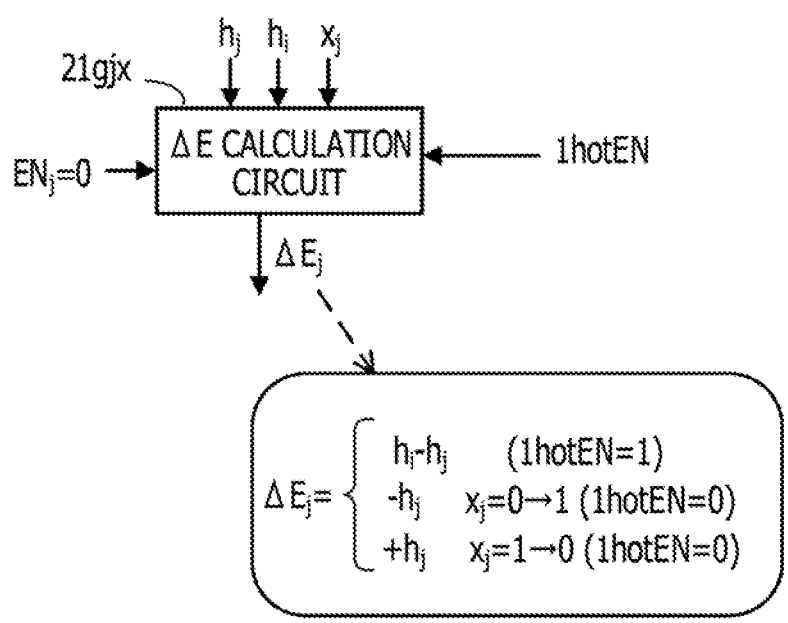
FIG. 21 is a diagram illustrating an example of a ΔE calculation circuit in the optimization device having the configuration that disables the one-hot constraint support function.

FIG. 21 is a diagram illustrating an example of a ΔE calculation circuit in the optimization device having the configuration that disables the one-hot constraint support function.

A ΔE calculation circuit 21*gjx* corresponds to the ΔE calculation circuit 21*gj* illustrated in FIG. 14. Unlike the ΔE calculation circuit 21*gj*, 1*hot*EN and $x_j$ are supplied to the ΔE calculation circuit 21*gjx*. Note that, in the case of 1*hot*EN=0, out of $h_j$ and $h_i$, $h_i$ is not supplied.

In the case of 1*hot*EN=1, the ΔE calculation circuit 21*gjx* as described above calculates $\Delta E_j = h_i - h_j$, similarly to the ΔE calculation circuit 21*gj* illustrated in FIG. 14. On the other hand, in the case of 1*hot*EN=0, $\Delta E_j$ is determined by a change in $x_j$. In a case where $x_j$ changes from 0 to 1, $\Delta E_j = -h_j$ is obtained, and in a case where $x_j$ changes from 1 to 0, $\Delta E_j = +h_j$ is obtained. Thus, the ΔE calculation circuit 21*gjx* receives the current $x_j$ from the update unit 24, and in the case of 1*hot*EN=0, outputs $-h_j$ as $\Delta E_j$ in the case of $x_j = 0$, and outputs $+h_j$ as $\Delta E_j$ in the case of $x_j = 1$.

Each of the ΔE calculation circuits 21*g*1 to 21*g*N illustrated in FIG. 5 is also configured as illustrated in FIG. 21.

An identification information calculation unit in the optimization device having the configuration that disables the one-hot constraint support function can be implemented by enabling or disabling the function of the identification information calculation unit 23 illustrated in FIG. 4 depending on the value of 1*hot*EN. In that case, the index=l output by the selection circuit 22 is supplied as it is to the calculation unit 21 and the update unit 24.

As described above, the above-described modification is performed on the optimization device 20 of the second embodiment, whereby it is possible to disable the one-hot constraint support function depending on the problem to be calculated, and execute the function of performing the state transition of the Hamming distance=1.

In a case where the one-hot constraint support function is disabled, each of $\Delta E_1$ to $\Delta E_N$ supplied to the selection circuit 22 represents an energy change due to a change in any one of the N bits. Then, the selection circuit 22 outputs an index for identifying one bit that allows to be updated among the N bits, on the basis of the above-described magnitude relationships between the thermal excitation energy and $\Delta E_1$ to $\Delta E_N$. The update unit 24 updates the value of the bit identified by the index.

By the way, in the above description, the ΔE calculation circuits 21*g*1 to 21*g*N each calculate the energy change without using $W_{ij}$, assuming that $W_{ij} = 0$ in the expression (7), but may calculate the energy change by using $W_{ij}$.

Figure 22:
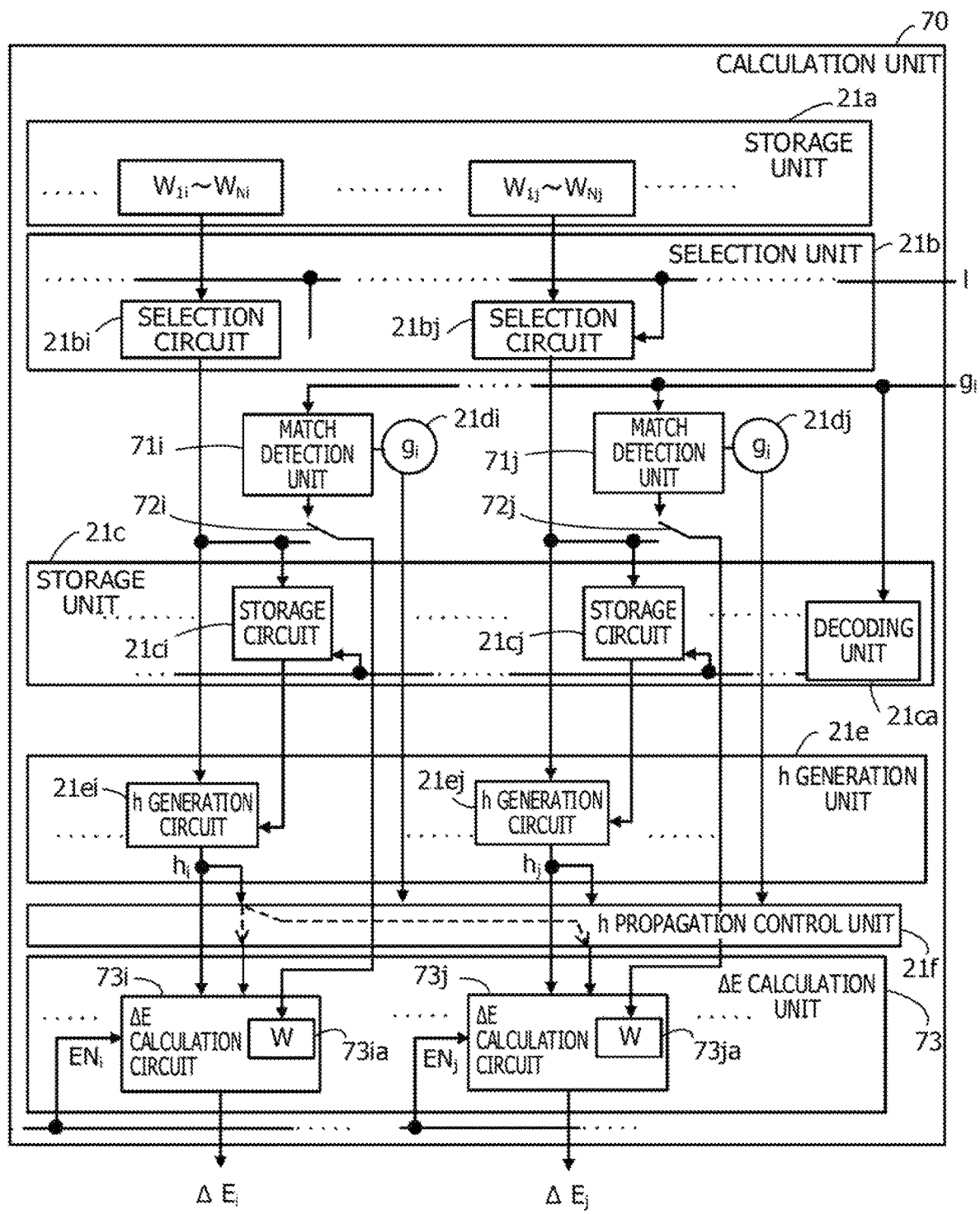
FIG. 22 is a diagram illustrating an example of a calculation unit in an optimization device that calculates an energy change by using weight values.

FIG. 22 is a diagram illustrating an example of a calculation unit in an optimization device that calculates an energy change by using weight values. In a calculation unit 70 of FIG. 22, the same elements as those of the calculation unit 21 illustrated in FIG. 5 are denoted by the same reference numerals. Note that, in FIG. 22, illustration is omitted other than elements corresponding to the i, j-th elements in the selection circuits 21*b*1 to 21*b*N, the storage circuits 21*c*1 to 21*c*N, the holding units 21*d*1 to 21*d*N, the h generation circuits 21e1 to 21eN, and the ΔE calculation circuits 21g1 to 21gN in FIG. 5.

The calculation unit 70 includes match detection units 71i and 71j, and switches 72i and 72j. Furthermore, in the calculation unit 70, ΔE calculation circuits 73i and 73j of a ΔE calculation unit 73 include storage units 73ia and 73ja.

A circuit unit including the match detection units 71i and 71j, and the switches 72i and 72j has the following function.

The match detection unit 71i outputs 1 in a case where the group index=$g_l$ supplied from the identification information calculation unit 23 matches the $g_i$ held in the holding unit 21di, and outputs 0 in a case where they do not match each other. The match detection unit 71j outputs 1 in a case where the group index=$g_l$ matches $g_j$ held in the holding unit 21dj, and outputs 0 in a case where they do not match each other.

Each of the match detection units 71i and 71j is implemented by using, for example, a plurality of ExNOR circuits and one AND circuit. For example, each of the plurality of ExNOR circuits inputs a value of each one bit of corresponding bits of the input two group indexes, and outputs 1 in a case where both bits match each other. Then, the AND circuit outputs 1 in a case where outputs of the plurality of ExNOR circuits are all 1.

The switch 72i is turned on in a case where the match detection unit 71i outputs 1, and supplies a weight value output by the selection circuit 21bi to the storage unit 73ia of the ΔE calculation circuit 73i. The switch 72i is turned off in a case where the match detection unit 71i outputs 0. The switch 72j is turned on in a case where the match detection unit 71j outputs 1, and supplies a weight value output by the selection circuit 21bj to the storage unit 73ja of the ΔE calculation circuit 73j. The switch 72j is turned off in a case where the match detection unit 71j outputs 0. Each of the switches 72i and 72j is, for example, a tri-state buffer.

For example, when the switch 72i is turned on, $W_{li}$ read from the storage unit 21a is written to the storage unit 73ia and the storage circuit 21ci at the same timing. When the switch 72j is turned on, $W_{lj}$ read from the storage unit 21a is written to the storage unit 73ja and the storage circuit 21cj at the same timing.

The ΔE calculation circuits 73i and 73j calculate $\Delta E_i$ and $\Delta E_j$ of when a transition is performed from one state satisfying the one-hot constraint to another state satisfying the one-hot constraint by the state transition of the Hamming distance=2, by using the local field values and the weight values.

To the ΔE calculation circuit 73i, $h_i$ is directly supplied from the h generation circuit 21ei. To the ΔE calculation circuit 73j, $h_j$ is directly supplied from the h generation circuit 21ej.

Moreover, to the ΔE calculation circuit to which a local field value for a bit having a value of 0 is supplied from the h generation unit 21e, a local field value for a bit having a value of 1 belonging to the same group as that of the bit having the value of 0 is propagated by the h propagation control unit 21f.

For example, it is assumed that the bits with the indexes=i, j belong to the same group, the value of the bit with the index=i is 1, and the value of the bit with the index=j is 0. In that case, $h_i$ is propagated to the ΔE calculation circuit 73j by the h propagation control unit 21f. Furthermore, in that case, $W_{ij}$ is held in the storage unit 73ja of the ΔE calculation circuit 73j. The reason for that the value of the bit with the index=i is 1 is that at the time of writing to the storage unit 73ja, the index=l supplied to the selection unit 21b is equal to the index=i, and the weight value read from the storage unit 21a is $W_{lj}=W_{ij}$.

The ΔE calculation circuit 73j calculates $\Delta E_j$ due to a change of $x_i$ from 1 to 0 and a change of $x_j$ from 0 to 1, on the basis of $h_i$, $h_j$, and $W_{ij}$, with the expression (7). As described above, among the weight values read from the storage unit 21a for updating $h_j$, $W_{ij}$ used for calculating $\Delta E_j$ is held in the storage unit 73ja, so that $W_{ij}$ does not have to be read from the storage unit 21a again when $\Delta E_j$ is calculated.

Furthermore, $W_{ij}$ for performing calculation of the expression (7) is stored in the storage unit 73ja as described above, whereby it becomes possible to cope with a case where the weight values are changed to change the calculation condition and the like.

In the above, one aspect of the optimization device and the method for controlling the optimization device of the present embodiment has been described on the basis of the embodiments; however, these are only examples and are not limited to the above description.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
   a plurality of calculation circuits configured to calculate, for a plurality of original bits corresponding to a plurality of spins included in an Ising model obtained by converting a problem to be calculated, in a case where the plurality of original bits is divided into a plurality of groups, based on a first local field value for each of one or more first bits having a value of 1 and a second local field value for each of one or more second bits having a value of 0 among a plurality of bits included in each of the plurality of groups, a first energy change of the Ising model due to a change of the value of a first bit from 1 to 0 and a change of the value of a second bit from 0 to 1;
   a selection circuit configured to output first bit identification information for identifying the second bit that allows update of the value from 0 to 1 among the one or more second bits included in each of the plurality of groups, based on a magnitude relationship between the first energy change output from each of the plurality of calculation circuits and thermal excitation energy determined based on an input temperature parameter and a random number;
   an identification information calculation circuit configured to detect, by using table data or a logic circuit, a first group to which the second bit allowed to be updated belongs based on the first bit identification information output from the selection circuit, and output second bit identification information for identifying the first bit that belongs to the first group;
   an update circuit configured to update the value from 1 to 0 of the first bit that belongs to the first group based on the second bit identification information output from the identification information calculation circuit, and update the value from 0 to 1 of the second bit allowed to be updated based on the first bit identification information;

a second memory configured to hold all rows corresponding to bit identification information for identifying a bit having a value of 1 in a matrix of weight values that indicate a magnitude of interaction between each of the plurality of bits held in a first memory, in each of the plurality of groups; and a generation circuit configured to read a first row corresponding to the first bit identification information from the first memory based on the first bit identification information output from the selection circuit, read a second row corresponding to the second bit identification information from the second memory at a same timing as a timing to read the first row and generate the first local field value and the second local field value based on the first row and the second row.

2. The information processing device according to claim 1, wherein the second memory includes a first holding area and a second holding area for each of the plurality of groups, and when the first row for the first group is read from the first memory, the first row is written to the first holding area, and the second row is read from the second holding area, and when the first row for the first group is read from the first memory next, the first row read is written to the second holding area, and the first row held in the first holding area is read as the second row.

3. The information processing device according to claim 2, wherein the processor is configured to: output group identification information for identifying the first group; and set one of the first holding area or the second holding area as a writing target; and set the other of the first holding area or the second holding area as a reading target based on the group identification information.

4. The information processing device according to claim 1, wherein the processor is configured to connect the second memory to the first memory in a case where an enable signal has a first value; disconnect the second memory from the first memory in a case where the enable signal has a second value; in a case where the enable signal has the second value, generate a third local field value for each of the plurality of bits when one of the plurality of bits changes; calculate a second energy change of the Ising model when one of the plurality of bits changes, based on the third local field value; output third bit identification information for identifying one third bit that allows update from among the plurality of bits, based on a magnitude relationship between the second energy change and the thermal excitation energy; and update a value of the third bit based on the third bit identification information.

5. The information processing device according to claim 1, wherein the processor is configured to hold, in a third memory, a weight value that indicates a magnitude of interaction between the first bit and the second bit.

* * * * *